United States Patent [19]

Anderson et al.

[11] Patent Number: 5,951,679
[45] Date of Patent: Sep. 14, 1999

[54] MICROPROCESSOR CIRCUITS, SYSTEMS, AND METHODS FOR ISSUING SUCCESSIVE ITERATIONS OF A SHORT BACKWARD BRANCH LOOP IN A SINGLE CYCLE

[75] Inventors: Timothy D. Anderson, Dallas; Jonathan H. Shiell, Plano, both of Tex.

[73] Assignee: Texas Instruments Incorporated, Dallas, Tex.

[21] Appl. No.: 08/962,105

[22] Filed: Oct. 31, 1997

[51] Int. Cl.[6] .................................................. G06F 9/38
[52] U.S. Cl. ............................................................ 712/241
[58] Field of Search .............................. 399/588; 712/241

[56] References Cited

U.S. PATENT DOCUMENTS

| | | | |
|---|---|---|---|
| 4,876,642 | 10/1989 | Gibson | 395/588 |
| 5,113,370 | 5/1992 | Tomita | 395/588 |
| 5,701,435 | 12/1997 | Chi | 395/588 |

OTHER PUBLICATIONS

Hiraki et al., "Stage–Skip Pipeline: a Low Power Processor Architecture Using a Decoded Instruction Buffer", *International Symposium on Low Power Electronics and Design*, IEEE, pp. 353–358, Aug. 12–14, 1996.

Okamoto et al., "Design Considerations for 32–bit Microprocessor TX3", *Compcon Spring '88. Thirty–Third IEEE Computer Society International Conference, Digest of Papers*, pp. 25–29, Feb. 29–Mar. 3, 1988.

Ditzel et al., "The Hardware Architecture of the CRISP Microprocessor", 14th Annual International Symposium on Computer Architecture, ACM, pp. 309–319, Jun. 2–5, 1987.

*Primary Examiner*—William M. Treat
*Attorney, Agent, or Firm*—Robert D. Marshall, Jr.; Gerald E. Laws; Richard L. Donaldson

[57] ABSTRACT

In a preferred method embodiment, the method operates a microprocessor (36). The method fetches (14) a short backward branch loop (34) of instructions, wherein the short backward branch loop comprises a branch instruction (SSB) and a target instruction (TR) The method also determines that the short backward branch instruction is a short backward branch instruction after fetching it. Still further, the method stores (30) a short backward branch loop of execution unit instructions. This short backward branch loop comprises a branch execution unit instruction (SSB) and a target execution unit instruction (TR). Additionally, without re-fetching the short backward branch loop after the storing step, the method also executes (22) a plurality of iterations of the short backward branch loop of execution unit instructions over a plurality of clock cycles. More specifically, for certain ones the plurality of clock cycles (clock cycle 10), the execution step executes both a first set of the execution unit instructions corresponding to a first iteration and a second set of the execution unit instructions corresponding to a second iteration, where the second iteration immediately follows the first iteration.

44 Claims, 8 Drawing Sheets

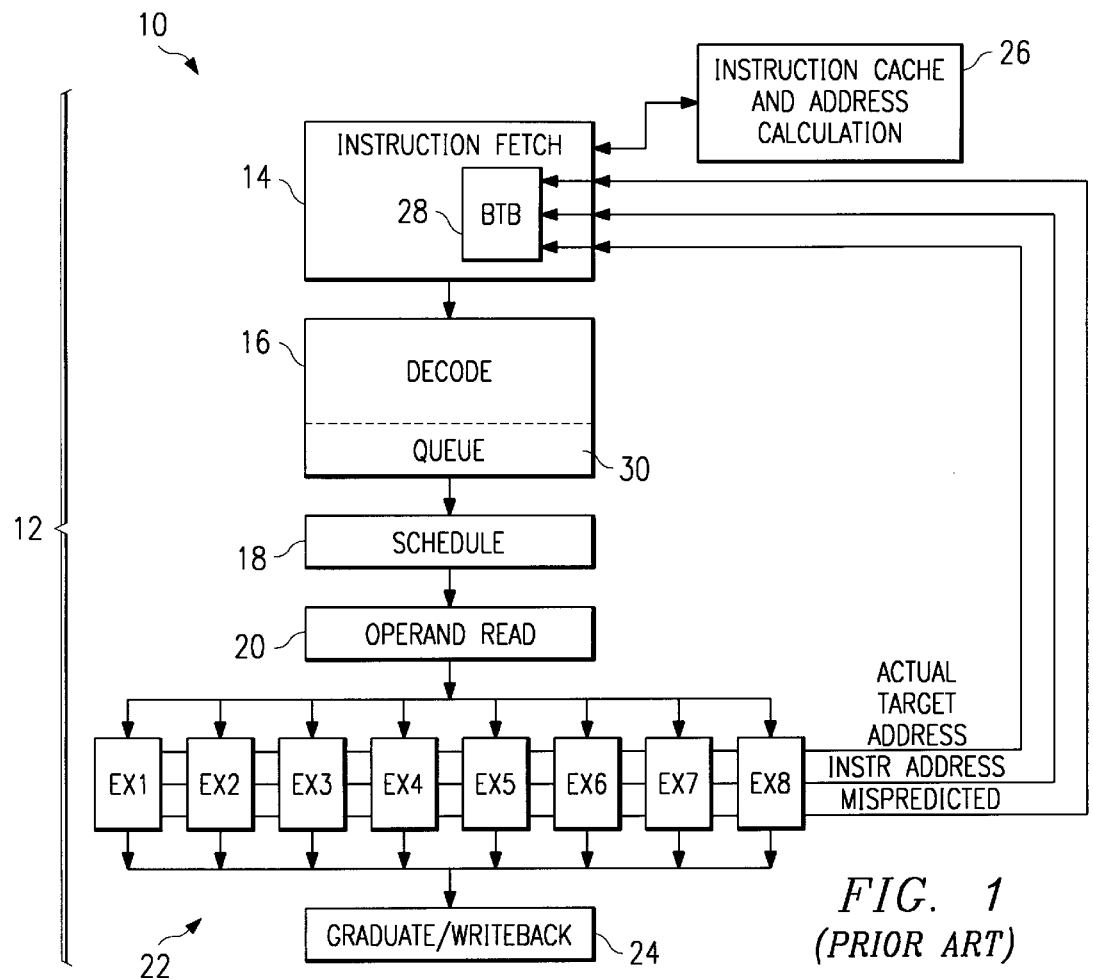
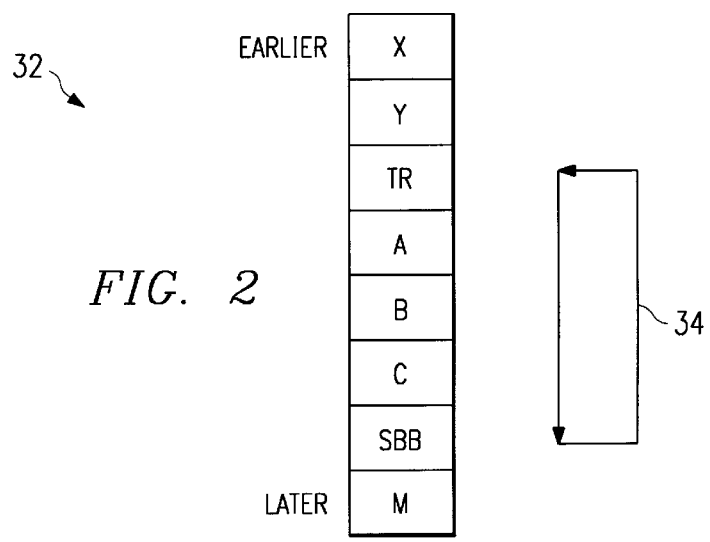
FIG. 1 (PRIOR ART)
FIG. 2

| | 1 | 2 | 3 | 4 | 5 | 6 | 7 | 8 | 9 | 10 | 11 |
|---|---|---|---|---|---|---|---|---|---|---|---|
| INSTRUCTION FETCH STAGE 14 | X Y TR A B C SBB M | N O P Q R S T U | - - - - - - - - | - - - - - - - - | - - - - - - - - | * * TR A B C SBB * | * * TR A B C SBB * | * * TR A B C SBB * | * * TR A B C SBB * | * * TR A B C SBB * | * * TR A B C SBB * |
| DECODE STAGE 16 AND QUEUE 30 | | X Y TR A B C SBB M | N O P Q R S T U | - - - - - - - - | - - - - - - - - | TR A B C SBB * * * | TR A B C SBB * * * | TR A B C SBB * * * | TR A B C SBB * * * | TR A B C SBB * * * | TR A B C SBB * * * |
| SCHEDULE STAGE 18 | | | X Y TR A B C SBB M | N O P Q R S T U | - - - - - - - - | - - - - - - - - | TR A B C SBB * * * | TR A B C SBB * * * | TR A B C SBB * * * | TR A B C SBB * * * | TR A B C SBB * * * |
| OPERAND READ STAGE 20 | | | | X Y TR A B C SBB M | N O P Q R S T U | - - - - - - - - | - - - - - - - - | - - - - - - - - | TR A B C SBB * * * | TR A B C SBB * * * | TR A B C SBB * * * |
| EXECUTE STAGE 22 | | | | | X Y TR A B C SBB M | - - - - - - - - | - - - - - - - - | - - - - - - - - | - - - - - - - - | TR A B C SBB * * * | TR A B C SBB * * * |

*FIG. 3*

|  | 1 | 2 | 3 | 4 | 5 | 6 | 7 | 8 | 9 | 10 | 11 |
|---|---|---|---|---|---|---|---|---|---|---|---|
| INSTRUCTION FETCH STAGE 14 | X Y TR A B C SBB M | N O P Q R S T U | - - - - - - - - | - - - - - - - - | - - - - - - - - | * * TR A B C SBB M | N O P Q R S T U | * * P Q R S T U | * * P Q R S T U | * * P Q R S T U | * * P Q R S T U |
| DECODE STAGE 16 AND QUEUE 30 |  | X Y TR A B C SBB M | N O P Q R S T U | - - - - - - - - | - - - - - - - - | - - - - - - - - | TR A B C SBB M * * | TR A B C SBB M N O | TR A B C SBB M N O | TR A B C SBB M N O | TR A B C SBB M N O |
| SCHEDULE STAGE 18 |  |  | X Y TR A B C SBB M | N O P Q R S T U | - - - - - - - - | - - - - - - - - | - - - - - - - - | TR1 A1 B1 C1 SBB1 TR2 A2 B2 | C2 SBB2 TR3 A3 B3 C3 SBB3 TR4 | A4 B4 C4 SBB4 TR5 A5 B5 C5 | SBB5 TR6 A6 B6 C6 SBB6 TR7 A7 |
| OPERAND READ STAGE 20 |  |  |  | X Y TR A B C SBB M | N O P Q R S T U | - - - - - - - - | - - - - - - - - | - - - - - - - - | TR1 A1 B1 C1 SBB1 TR2 A2 B2 | C2 SBB2 TR3 A3 B3 C3 SBB3 TR4 | A4 B4 C4 SBB4 TR5 A5 B5 C5 |
| EXECUTE STAGE 22 |  |  |  |  | X Y TR A B C SBB M | - - - - - - - - | - - - - - - - - | - - - - - - - - | - - - - - - - - | TR1 A1 B1 C1 SBB1 TR2 A2 B2 | C2 SBB2 TR3 A3 B3 C3 SBB3 TR4 |

*FIG. 5*

|  | 10 | 11 | 12 | 13 | 14 | 15 | 16 | 17 | 18 |
|---|---|---|---|---|---|---|---|---|---|
| INSTRUCTION FETCH STAGE 14 | *<br>*<br>TR<br>A<br>B<br>C<br>D<br>E | F<br>G<br>H<br>SBB<br>M<br>N<br>O<br>P | *<br>*<br>*<br>*<br>*<br>*<br>N<br>O | *<br>*<br>*<br>*<br>*<br>*<br>*<br>O | *<br>*<br>*<br>*<br>*<br>*<br>*<br>O | *<br>*<br>*<br>*<br>*<br>*<br>*<br>O | *<br>*<br>*<br>*<br>*<br>*<br>*<br>O | *<br>*<br>*<br>*<br>*<br>*<br>*<br>O | *<br>*<br>*<br>*<br>*<br>*<br>*<br>O |
| DECODE STAGE 16 AND QUEUE 30 | -<br>-<br>-<br>-<br>-<br>-<br>-<br>-<br>-<br>-<br>- | TR<br>A<br>B<br>C<br>D<br>E<br>*<br>*<br>*<br>*<br>* | TR<br>A<br>B<br>C<br>D<br>E<br>F<br>G<br>H<br>SBB<br>M<br>N | TR<br>A<br>B<br>C<br>D<br>E<br>F<br>G<br>H<br>SBB<br>M<br>N | TR<br>A<br>B<br>C<br>D<br>E<br>F<br>G<br>H<br>SBB<br>M<br>N | TR<br>A<br>B<br>C<br>D<br>E<br>F<br>G<br>H<br>SBB<br>M<br>N | TR<br>A<br>B<br>C<br>D<br>E<br>F<br>G<br>H<br>SBB<br>M<br>N | TR<br>A<br>B<br>C<br>D<br>E<br>F<br>G<br>H<br>SBB<br>M<br>N | TR<br>A<br>B<br>C<br>D<br>E<br>F<br>G<br>H<br>SBB<br>M<br>N |
| SCHEDULE STAGE 18 | -<br>-<br>-<br>-<br>-<br>-<br>- | -<br>-<br>-<br>-<br>-<br>-<br>- | -<br>-<br>-<br>-<br>-<br>-<br>- | TR1<br>A1<br>B1<br>C1<br>D1<br>E1<br>F1<br>G1 | H1<br>SBB1<br>TR2<br>A2<br>B2<br>C2<br>D2<br>E2 | F2<br>G2<br>H2<br>SBB2<br>TR3<br>A3<br>B3<br>C3 | D3<br>E3<br>F3<br>G3<br>H3<br>SBB3<br>TR4<br>A4 | B4<br>C4<br>D4<br>E4<br>F4<br>G4<br>H4<br>SBB4 | TR5<br>A5<br>B5<br>C5<br>D5<br>E5<br>F5<br>G5 |
| OPERAND READ STAGE 20 | -<br>-<br>-<br>-<br>-<br>-<br>- | -<br>-<br>-<br>-<br>-<br>-<br>- | -<br>-<br>-<br>-<br>-<br>-<br>- | -<br>-<br>-<br>-<br>-<br>-<br>- | TR1<br>A1<br>B1<br>C1<br>D1<br>E1<br>F1<br>G1 | H1<br>SBB1<br>TR2<br>A2<br>B2<br>C2<br>D2<br>E2 | F2<br>G2<br>H2<br>SBB2<br>TR3<br>A3<br>B3<br>C3 | D3<br>E3<br>F3<br>G3<br>H3<br>SBB3<br>TR4<br>A4 | B4<br>C4<br>D4<br>E4<br>F4<br>G4<br>H4<br>SBB4 |
| EXECUTE STAGE 22 | -<br>-<br>-<br>-<br>-<br>-<br>- | -<br>-<br>-<br>-<br>-<br>-<br>- | -<br>-<br>-<br>-<br>-<br>-<br>- | -<br>-<br>-<br>-<br>-<br>-<br>- | -<br>-<br>-<br>-<br>-<br>-<br>- | TR1<br>A1<br>B1<br>C1<br>D1<br>E1<br>F1<br>G1 | H1<br>SBB1<br>TR2<br>A2<br>B2<br>C2<br>D2<br>E2 | F2<br>G2<br>H2<br>SBB2<br>TR3<br>A3<br>B3<br>C3 | D3<br>E3<br>F3<br>G3<br>H3<br>SBB3<br>TR4<br>A4 |

*FIG. 7*

MICROPROCESSOR CIRCUITS, SYSTEMS, AND METHODS FOR ISSUING SUCCESSIVE ITERATIONS OF A SHORT BACKWARD BRANCH LOOP IN A SINGLE CYCLE

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to microprocessors, and are more particularly directed to microprocessor circuits, systems, and methods for issuing successive iterations of a short backward branch loop in a single execution cycle.

The embodiments described below involve the developing and ever-expanding field of computer systems and microprocessors. Significant advances have recently been made in the design of microprocessors to improve their performance, as measured by the number of instructions executed over a given time period. One such advance relates to microprocessors of the "superscalar" type, which can accomplish parallel instruction completion with a single instruction pointer. Typically, superscalar microprocessors have multiple execution units, such as multiple integer arithmetic logic units (ALUs), multiple load/store units (LSUs), and a floating point unit (FPU), each of which is capable of executing an instruction. As such, multiple machine instructions may be executed simultaneously in a superscalar microprocessor, providing clear benefits in the overall performance of the device and its system application.

Another common technique used in modem microprocessors to improve performance involves the "pipelining" of instructions. As is well known in the art, microprocessor instructions each generally involve several sequential operations, such as instruction fetch, instruction decode, reading of operands from registers or memory, execution of the instruction, and writeback of the results of the instruction. Pipelining of instructions in a microprocessor refers to the staging of this sequencing of the instructions so that multiple instructions in the sequence are simultaneously processed at different stages in the internal sequence. For example, if a pipelined microprocessor is executing instruction n in a given microprocessor clock cycle, a four-stage pipelined microprocessor may simultaneously (i.e., in the same machine cycle) retrieve the operands for instruction n+1 (i.e., the next instruction in the sequence), decode instruction n+2, and fetch instruction n+3. Through the use of pipelining, the performance of the microprocessor can effectively execute a sequence of multiple-cycle instructions at a rate of one per clock cycle.

Through the use of both pipelining and superscalar techniques, modern microprocessors may execute multi-cycle machine instructions at a rate greater than one instruction per machine clock cycle, assuming that the instructions proceed in a known sequence. However, as is well known in the art, many computer programs do not continuously proceed in the sequential order of the instructions, but instead include branches (both conditional and unconditional) to program instructions other than the next successive instruction in the current instruction sequence. Such operations challenge a computer for many reasons, such as instruction fetching and execution, and often depending on the type of branch instruction and the location of the target instruction. Indeed, branching complexities have arisen in computer systems for many years. For example, in the non-superscalar art and prior to the use of caches, the IBM 360 Model 91 included a loop buffer to achieve a cache-like operation in the context of branch looping. Particularly, an instruction buffer was included within the system which received fetched instructions. If it was detected that the instructions within the buffer represented a branch loop, then effectively a cache had been created from which each instruction could then be retrieved and singularly executed until all desired iterations of the loop were complete, and without having to re-fetch the loop instructions from main memory (which was core memory). Consequently, the excess time otherwise required to fetch these instructions was eliminated.

In the context of branches in superscalar microprocessors, the present embodiments are directed to what is referred to in this document as a short backward branch instruction. A backward branch instruction is an instruction which, when the branch is taken, directs flow to a target instruction which precedes the branch instruction. A short backward branch instruction operates in this manner, but the backward branching to the target instruction spans only a relatively small number of instructions. The particular number of instructions at this point need not be defined, but this application assumes a number on the order of five for sake of example. Thus, a branch instruction which branches (when taken) to a target which is five or less instructions before the branch instruction may be referred to as a short backward branch instruction.

Given the above introduction of a short backward branch instruction, the present inventors have recognized a considerable drawback which may occur when processing the executable instructions from the loop defined by the short backward branch instruction, that is the instructions between and including the short backward branch instruction and its target instruction. Specifically, under current technology, when a short backward branch instruction loop is processed, only a number of executable instructions equal to or less than the number of executable instructions within that loop are executed in a single clock cycle. In other words, if the number of execution units is greater than the number of executable instructions derived from the short backward branch instruction loop, then certain execution units do not execute during the cycle when the short backward branch instruction is executed. As a numeric example, suppose that an execution stage includes eight execution units, and that there are five executable instructions derived from the short backward branch loop. Given these assumptions, in the prior art at least three of the execution units do not execute while the short backward branch loop is executed. As a result, there is considerable non-use of the execution units. In addition, resources in other locations of the instruction pipeline also may be unused when processing a short backward branching instruction loop. Moreover, as the number of execution units or other non-used resources increases, or where the number of executable instructions from the short backward branch loop decreases, the inefficiency is even greater.

In view of the above, there arises a need to address the drawbacks of the prior art systems and provide a microprocessor operable to more efficiently use its resources such as by executing more than one short backward branch loop in a single execution cycle.

BRIEF SUMMARY OF THE INVENTION

In a preferred method embodiment, the method operates a microprocessor. The method fetches a short backward branch loop of instructions, wherein the short backward branch loop comprises a branch instruction and a target instruction. The method also determines that the short backward branch instruction is a short backward branch instruction after fetching it. Still further, the method stores a short backward branch loop of execution unit instructions. This short backward branch loop comprises a branch execution unit instruction and a target execution unit instruction. Additionally, without re-fetching the short backward branch loop after the storing step, the method also executes a plurality of iterations of the short backward branch loop of execution unit instructions over a plurality of clock cycles. More specifically, for certain ones the plurality of clock cycles, the execution step executes both a first set of the execution unit instructions corresponding to a first iteration and a second set of the execution unit instructions corresponding to a second iteration, where the second iteration immediately follows the first iteration. Other circuits, systems, and methods are also disclosed and claimed.

BRIEF DESCRIPTION OF THE SEVERAL VIEWS OF THE DRAWING

FIG. 1 illustrates a microprocessor pipeline which may be modified to more efficiently process short backward branch instruction loops;

FIG. 2 illustrates an example instruction sequence including a short backward branch instruction loop;

FIG. 3 illustrates a timing diagram of a short backward branch instruction sequence passing through the instruction pipeline of FIG. 1;

FIG. 5 illustrates a timing diagram of a short backward branch instruction sequence passing through the instruction pipeline of FIG. 4, where the sequence includes a number of instructions less than the number of execution units;

FIG. 7 illustrates a timing diagram of a short backward branch instruction sequence passing through the instruction pipeline of FIG. 4, where the sequence includes a number of instructions larger than the number of execution units.

DETAILED DESCRIPTION OF THE INVENTION

Figure 4:
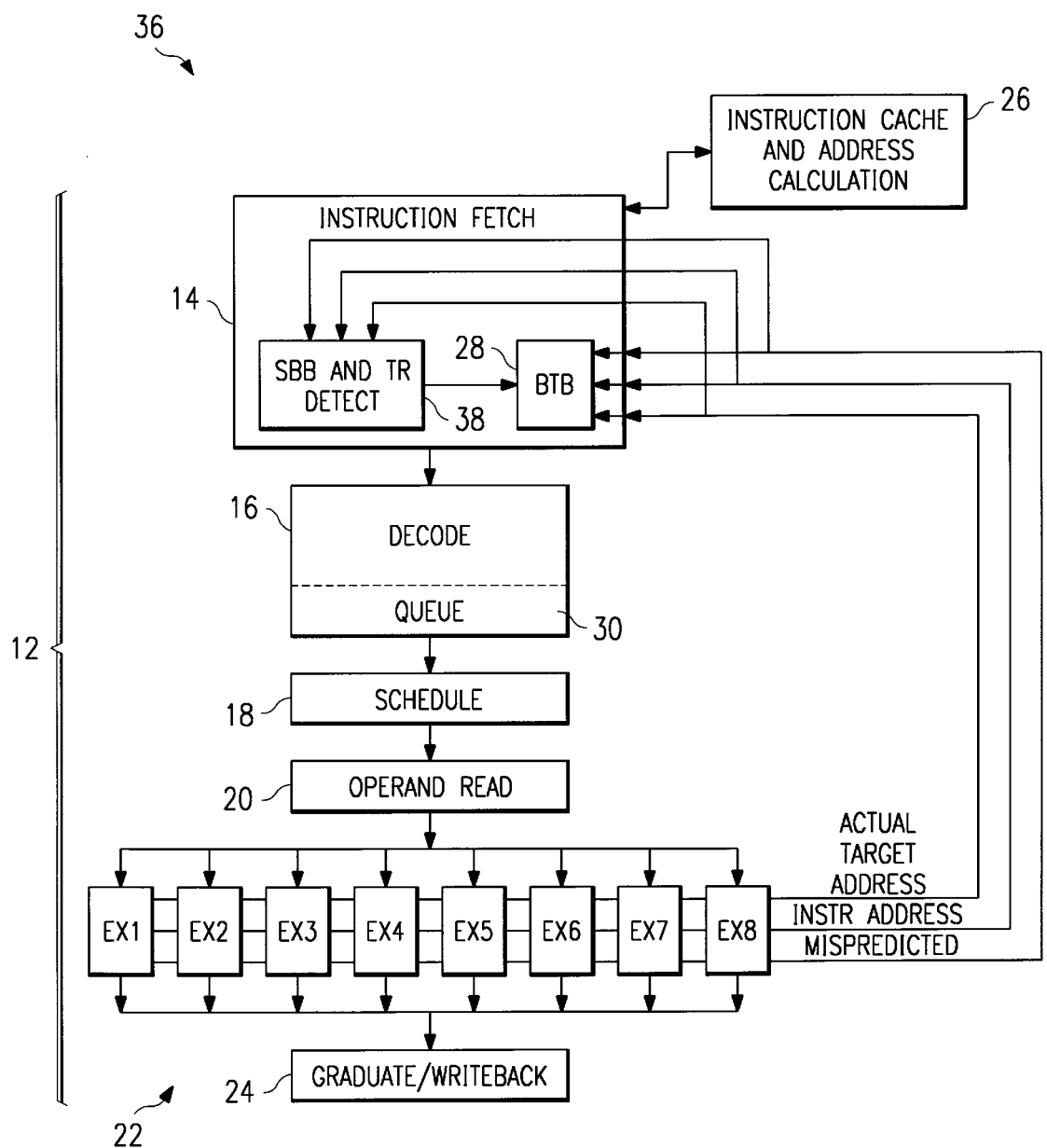
FIG. 4 illustrates modifications to the microprocessor pipeline of FIG. 1 so that it may more efficiently process short backward branch instruction loops in accordance with the present inventive embodiments.

FIG. 1 illustrates an instruction processing system designated generally at 10 and which is used by way of introduction to the type of system in which the present embodiments may be incorporated. System 10 in its general sense is the same as exists in many known prior art microprocessors, and is provided to demonstrate a context to demonstrate the overall operation of the present embodiments, with the detailed discussion of the inventive aspects deferred until later. Note also that the microprocessor structure of FIG. 1 as well as alternative known microprocessors include numerous additional aspects not shown. However, at this point, such other known microprocessor details are not described to simplify the discussion. Turning then to system 10, it includes a pipeline 12 which in certain respects is similar to the type commonly existing in the current art to receive and process instructions in a complex instruction set computer ("CISC"). Note at this point that use of a CISC pipeline is by way of example, and further that various of the inventive principles set forth in this document also may be applied by a person skilled in the art to a reduced instruction set computer ("RISC") as well. Turning then to the example of FIG. 1, pipeline 12 is shown by way of example as having six stages evenly numbered 14 through 24. Each of stages 14 through 24 represents a stage or stages known in the art, and may differ in name and/or function in different architectures. Generally, and as known in the art, a microprocessor pipeline includes a beginning stage, an ending stage, and a group of intermediary stages, where an instruction passes from the beginning toward the ending stage with one or more operations occurring in response to the instruction being at each stage. As detailed below in connection with FIGS. 4 through 7, however, pipeline 12 may be modified to greatly differ from the prior art at least insofar as short backward branch instructions are processed. Before reaching a detailed discussion of the operations of the modifications to system 10 in connection with short backward branch instructions, some generalizations are helpful to further appreciate the inventive scope. Thus, the following discussion is by way of example and without limitation to the inventive embodiments discussed later.

Turning to pipeline 12, note generally that an instruction is retrieved at a beginning pipeline stage which in the present example is instruction fetch stage 14. Instruction fetching by stage 14 may occur from various resources such as caches and various levels of memory, and also may include address manipulation such as translation between a logical address and a physical address. Therefore, instruction fetch stage 14 is further shown connected to an instruction cache and address calculation circuit 26. Additionally, instruction fetch stage 14 includes a branch target buffer ("BTB") 28 which is known in the art, and which predicts whether a branch instruction is taken as is also known in the art. Additionally, BTB 28 may be modified as discussed later in connection with short backward branch instructions. Note also that BTB 28 is shown within stage 14 only by way of example and because of its functional relationship to the instruction fetching process; nevertheless, it may be a separate physical structure rather than as shown in FIG. 1.

Typically, after an instruction is received by instruction fetch stage 14, it is thereafter decoded in one or more decode stages. While a pipeline may therefore include any number of decode stages, pipeline 12 is simplified to show only a single decode stage 16 by way of example. Further, different teachings in the art refer to these stages in different manners; for example, often these stages are broken down into so-called predecode stages followed by decode stages. In all events, the one or more decode stage decompresses the more complicated instruction set architecture instruction into one or more simpler operations referred to in this document as execution unit instructions for reasons more clear below. These execution unit instructions typically may be executed in a single execution clock. Note also that execution unit instructions have different names depending on the architecture and/or manufacturer. For example, in the Texas Instruments' standard, execution unit instructions are referred to as atomic operations ("AOps"). These AOps, if completed in their entirety, represent completion and graduation of the instruction set instruction, including its opcode and operands if applicable. Note that AOps are approximately comparable to some RISC instructions and, thus, are the codes which are connected to various portions of the microprocessor to subsequently initiate execution of the decoded instruction. Thus, AOps are comparable to what is referred to in other architectures as ROps, μOps, or RISC86 instructions. Moreover, note in some RISC architectures that the instruction set instruction and the execution unit instruction are the same instruction (whereas for the CISC system the instruction set instruction is decoded to form one or more execution unit instructions which differ from the instruction set instruction itself). Therefore, by use of execution unit instruction it is intended to cover this RISC architecture as well. In any event, once the execution unit instructions are formed (or merely brought forward as instruction set instructions in the case of some RISC systems), they are stored in a storage structure which, for purposes of FIG. 1, is shown as a queue 30 within decode stage 16. Thus, queue 30 stores the execution unit instructions for passage to the next successive pipeline stage described below.

Queue 30 provides the execution unit instructions to schedule stage 18 which schedules those instructions to the corresponding appropriate execution units of the microprocessor. In some conventions, the schedule stage is referred to as the issuing of each execution unit instruction to its appropriate execution unit. For example, pipeline 12 includes an execution stage 22, which includes eight execution units (designated EX1 through EX8). Such execution units may be of various types, such as an arithmetic unit, a load/store unit, or a floating point unit. In addition, a single type may be repeated so that the pipeline includes two or more of those types, such as two arithmetic units, two load/store units, and so forth. In all events, for pipeline 12 which includes eight execution units, up to eight execution unit instructions generally may be scheduled by stage 18 for execution in a single clock cycle by each corresponding execution unit. Moreover, a microprocessor may include more than eight execution units and, thus, the number of execution unit instructions to be executed in a single clock cycle may be increased accordingly.

After the execution unit instructions are issued, operand read stage 20 reads any operands necessary to execute any one or more of the currently-scheduled execution unit instructions. Typically, this includes operands read from registers. Next, in stage 22 and as introduced above, the execution unit instructions are executed, that is, each execution unit EX1 through EX8 performs its corresponding functionality on its scheduled execution unit instruction. Note that one or more of the execution units EX1 through EX8 includes particular branch handling circuitry, for detecting and responding to a branch and performing other branch-related function as either set forth in this document or known in the art. Indeed, in this regard, note that execute stage 22 also provides three branch-related control signals to BTB 30 when processing a branch instruction. Specifically, and as detailed later, upon executing a branch instruction, execute stage 22 determines the actual (as opposed to the predicted) target address corresponding to a branch instruction; thus, this address is communicated to BTB 23 and is shown as the ACTUAL TARGET ADDRESS signal on FIG. 1. In addition, execute stage 22 further determines whether the ACTUAL TARGET ADDRESS for a given branch instruction matches the predicted target address for the same branch instruction. The result of this determination is passed to BTB 20 via the MISPREDICTED signal. The MISPREDICTED signal includes at least two bits, one bit for indicating whether the prediction is accurate and another bit for indicating whether the current MISPREDICTED signal is valid. Note also that some architectures may actually provide either or both of these control signals from areas other than an execution unit or even before the execute stage. For example, some architectures may determine during decoding of an instruction that the instruction is not a branch instruction, yet it is predicted as taken. Naturally, a taken prediction of a non-branch instruction is inaccurate because the non-branch instruction by definition does not "take" a branch. Thus, this instance results in a misprediction even before the branch instruction reaches the execute stage. Other examples also will be ascertainable by a person skilled in the art. Lastly, in addition to the ACTUAL TARGET ADDRESS and MISPREDICTED signals, execute stage 22 also provides to BTB 28 the address of a branch instruction being executed (shown as BRANCH ADDRESS in FIG. 1). Still other signals may be provided by execute stage 22 to BTB 28 as known in the art.

Completing pipeline 12, stage 24 graduates the instruction, meaning the instruction completes and take its effect, if any, on the architected state of the microprocessor. In addition, the result of the instruction, if any, may be written to some store such as a register file. This last operation is commonly referred to as writeback, and sometimes is considered a function which is not part of the final pipeline stage, but which occurs at the same time the instruction is graduated.

FIG. 2 illustrates an example stream of instructions designated generally at 32 for purposes of greater introduction to the short backward branch instruction mentioned in the Background above. Instruction stream 32 includes eight instructions which, from top to bottom across the Figure, are sequential in nature (i.e., those to the top of the Figure are earlier in the instruction sequence than those to the bottom of the Figure). Each instruction is designated by a capital letter or abbreviation to simplify the current discussion. Starting with the earliest instruction X, it is followed in the sequence by instruction Y. Next is the target instruction for the short backward branch instruction, and this target instruction is abbreviated in FIG. 2 as instruction TR. Following the TR instruction are three instructions A, B, and C, which are followed by the short backward branch instruction abbreviated as SBB. Lastly, following the SBB instruction is an additional instruction, arbitrarily indicated in FIG. 2 as instruction M.

The processing of instruction stream 32 is first described generally to demonstrate the processing of a short backward branch operation, with a description contrasting the prior art and the present embodiments set forth below in connection with FIGS. 3 and 5, respectively. Turning then to the general operation, when the SBB instruction is incurred, and assuming the branch is taken, the program flow returns to process the TR instruction as well as instructions A, B, and C. Thus, a loop is defined and designated generally at 34 in FIG. 2. Thus, loop 34 finishes by reaching the SBB instruction again. Assuming, however, that the SBB branch is again taken, the process repeats such that loop 34 may be processed in this manner for numerous iterations. Typically, at some point, the short backward branch is no longer taken and the next successive instruction following the SBB (e.g., instruction M) is processed. Given the above, therefore, instruction stream 32 includes a branching loop 34 consisting of five instructions. Each such loop 34, therefore, includes a branch instruction, a target instruction, and a small number of instructions between the branch and target instructions. For purposes of this document, this small number of instructions are referred to as intermediary instructions for ease of discussion. In addition, while loop 34 of FIG. 2 includes five instructions by way of example, the length of a short backward branch loop for purposes of defining other examples using the present embodiments is further defined after an appreciation of various other aspects demonstrated in FIGS. 3 through 7, below.

FIG. 3 illustrates a timing diagram of instruction stream 32 of FIG. 2 as it is processed in a prior art manner by a microprocessor structure such as system 10 shown in FIG. 1. In general, the horizontal axis from left to right across FIG. 3 represents successive microprocessor clock cycles, while the vertical axis from top to bottom across FIG. 3 represents the passage of an instruction stream through the microprocessor pipeline 12. Thus, during clock cycle 1, instruction stream 32 is fetched by instruction fetch stage 14 from instruction cache circuit 26. In response to the fetch, the SBB instruction is identified as a branch instruction so BTB 28 is consulted to determine the prediction for the branch. For the present example, assume that this is the first instance where this particular SBB instruction is fetched and, therefore, assume further that the branch is either not predicted (i.e., there is not at that point a corresponding indication in BTB 28) or was predicted not taken as is often the case for a first time fetch. Lastly, note that instruction stream 32 is oriented in FIG. 3 to show the earliest instruction (i.e., instruction X) at the top of the sequence and the latest instruction (i.e., instruction M) at the bottom of the sequence.

During clock cycle 2, FIG. 3 illustrates that instruction stream 32 passes in its same orientation to queue 30. From FIG. 2, note therefore that it is suggested that each instruction of instruction stream 32 is decoded and passes to queue 30. Note that this depiction makes two assumptions to simplify the present discussion. First, it is assumed that only a single clock cycle is expended in decoding each instruction from stream 32. Note, however, that it is possible that multiple clock cycles (and multiple decode stages) may actually decode each instruction. Second, it is assumed for each instruction of instruction stream 32 that a single corresponding execution unit instruction results from the decode operation. Note, however, that some instructions may be decoded into two or more execution unit instructions. Nevertheless, to simplify the current explanation, and as is often the case, assume that the execution unit instructions at the queue stage and beyond shown in FIG. 3 correspond one-on-one to instructions which were fetched in an earlier stage and then decoded.

In addition to the presence of instruction stream 32 in queue 30 during clock cycle 2 in FIG. 3, note also that instruction fetch stage 14 during that same clock cycle 2 also fetches the next line of instructions following instruction stream 32. To illustrate this point, sequential capital letters are used to designate those instructions. Thus, since the last instruction in instruction stream 32 is instruction M, then the next eight fetched instructions following instruction M are instructions N through U as shown at the fetch stage during clock cycle 2.

During clock cycle 3, each execution unit instruction corresponding to instruction stream 32 is processed by schedule stage 18 and is scheduled for execution. Assuming an optimized scheduling, note that each one of the eight execution unit instructions is scheduled to one of the eight execution units of execution stage 22 shown in FIG. 1. Note also during clock cycle 3 that the instruction stream following instruction stream 32 (i.e., instructions N through U) are also decoded and placed in queue 30. Still further, note that yet another instruction stream following instructions N through U is fetched by instruction fetch stage 14; however, to simplify FIG. 3, only the processing of instruction stream 32 as well as the next successive stream (i.e., instructions N through U) is shown so as to simplify the illustration and the present discussion.

During clock cycle 4, each execution unit instruction corresponding to instruction stream 32 passes to operand read stage 20. Thus, to the extent that operands are required for execution of any one or more of those execution unit instructions, such operands are read at this time (e.g., from a register). Again, note also during clock cycle 4 that the instruction stream following instruction stream 32 (i.e., instructions N through U) are scheduled by schedule stage 18, again in an optimum situation so that each execution unit instruction is assigned to one of the eight execution units of execution stage 22.

Lastly, during clock cycle 5, each execution unit instruction corresponding to the instructions from instruction stream 32 is executed. At this point, however, assume that the short backward branch instruction, SBB, is determined by its execution unit to be taken. However, since the SBB instruction was either predicted not taken (or not predicted because of a lack of an entry in BTB 28), then a misprediction (or its equivalent in the case where no BTB entry existed) has occurred. Consequently, returning briefly to FIG. 1, the MISPREDICTED signal is asserted, and pipeline 12 is flushed. In addition, if the branch was mispredicted, then BTB 28 is updated so that its indication corresponding to the SBB instruction is changed from not taken to taken. Similarly, if there was not yet a corresponding indication of the branch in BTB 28, then at this time one is established and the prediction is set to taken. In either event, the ACTUAL TARGET ADDRESS corresponding to the branch target instruction TR is communicated to instruction fetch stage 14. Thus, because the SBB instruction is taken, instruction fetch stage 14 next fetches a set of instructions to include the TR instruction, as further described in connection with clock cycle 6 below.

The next successive clock cycle shown within FIG. 3 is identified as clock cycle 6. However, it should be noted that following a branch misprediction and pipeline flush as discussed above, often several clock cycles will elapse before the next successive fetch into the pipeline occurs. Nevertheless, to simplify the sequential nature of actions, FIG. 3 illustrates the next clock cycle following clock cycle 5 as clock cycle 6, with it understood by a person skilled in the art that actually the fetch and subsequent steps thereafter may not commence until some later clock cycle. Turning then to clock cycle 6 (or the next cycle in which the pipeline is then ready to proceed), instruction fetch stage 14 fetches, from instruction cache circuit 26, the TR instruction and some successive instructions following it. However, because instructions are fetched from a cache line, any instructions in that same line which precede the TR instruction (e.g., instructions X and Y) are not used. Nevertheless, because the TR instruction is aligned within a cache line, and because that alignment is preserved with instruction fetch stage 14, the first two instruction locations shown in instruction fetch stage 14 during clock cycle 6 begin with two asterisks, indicating no instruction is fetched in that location, or information in that location is either invalid or of no relevance. In addition, note further that since the fetched instruction line also contains the branch instruction SBB, then any other instruction following the SBB instruction in the same line (e.g., instruction M) is also either not fetched, or information in that location is either invalid or of no relevance (again shown by asterisks in FIG. 3). Summarizing clock cycle 6, therefore, only the loop 34 of instruction stream 32 is fetched, but its alignment within the cache line from which it is fetched is preserved.

During clock cycle 7, the fetched loop 34 from clock cycle 6 progresses through decode stage 16 and to queue 30. In addition, when placed in queue 30, loop 34 is re-aligned so that the target instruction TR is placed at the top of queue 30. Thus, to the extent that loop 34 has less instructions that the number of instructions which can be stored in queue 30, the remaining locations are unused. Thus, in the current example, loop 34 consists of five instructions while queue 30 has eight locations. Because loop 34 is re-aligned to the top of the queue 30, then the remaining three locations of queue 30 are unused. Note also during clock cycle 7 that instruction fetch stage 14 again fetches the next iteration of loop 34 in the same manner as described above in connection with clock cycle 6.

Given the above, loop 34 as fetched from clock cycle 6 progresses through the pipeline during clock cycles 8, 9, and 10 by which time it reaches execute stage 22. At the same time, the preceding stages process subsequent iterations of loop 34, so that those iterations also are fetched, decoded and queued, scheduled and so forth behind loop 34 as it was fetched from clock cycle 6. Turning then to execute stage 22 during clock cycle 10, note that only loop 34 was available for scheduling and, therefore, execute stage 22 executes the first iteration of the loop, that is, only the five execution unit instructions assigned to it from schedule stage 18 (after operands are read from stage 20). In other words, for each clock cycle, only execution unit instructions for a single iteration of the loop are executed. Consequently, note that some of the execution units are unused in a manner similar to the non-use of locations within queue 30. In other words, in the current example, loop 34 only includes five execution unit instructions, thereby requiring only five execution units to execute one loop of the short backward branch. As a result, the remaining three execution units of execution stage 22 remain idle during clock cycle 10. Moreover, after clock cycle 10, note that for each subsequent execution iteration of loop 34, again one iteration of the loop is executed and, therefore, only five execution units execute. This process continues until the branch is no longer taken. At that point, and although not shown, the branch is then mispredicted and the pipeline is again flushed in response to the MISPREDICTED signal. Next, the line including the short backward branch is one again fetched, but this time it includes any instructions following the TR instruction, so that those following instructions may then be processed through the pipeline and executed as known in the art.

The above is provided to illustrate that the present inventors have recognized various inefficiencies of the prior art, such as the inefficiency of not using locations within queue 30 as well as not using execution units for a short backward branch instruction such as that shown by way of example above. Indeed, note further that this non-use of queue locations and execution units occurs for each subsequent iteration of loop 34. Thus, the more times loop 34 is executed, the greater the inefficiency. In addition, the above example shows a backward branch loop of five instructions, with a queue having eight locations and an execution stage having eight execution units. Thus, while non-use is three locations in queue 30 and three execution units in execution stage 22, the non-use would be even greater if there were fewer instructions in loop 34, or if execution stage 22 included more than eight execution units.

Given the appreciation of the above aspects by the present inventors, the embodiments below permit various benefits over this prior art approach. These benefits are better appreciated from the detailed discussion below, but are briefly introduced at this point given the current understanding of the disadvantages of the FIG. 3 approach. For example, in the preferred embodiment each location of queue 30 is filled after a first iteration even though a short backward branch loop is being processed. As another example, each execution unit of execution stage 22 is permitted to execute an instruction during a single clock cycle even though a short backward branch loop is being processed so that preferably no execution unit is not used during the execution cycle as is the case in FIG. 3. In connection with this latter goal, note that execution units beyond those required to execute one iteration of the short backward branch loop preferably are used during the same clock cycle to simultaneously execute another iteration (either in part or entirely) of a subsequent iteration of the loop. These benefits are better appreciated from the discussion of FIGS. 4 through 7, below.

FIG. 4 illustrates an instruction processing system designated generally at 36 and which is the same as system 10 of FIG. 1 with the exception that added features are provided to overcome the inefficiencies introduced immediately above and to accomplish the inventive aspects detailed below. Turning then to FIG. 4, where it is like FIG. 1 like reference numerals are carried forward to FIG. 4. System 36 further includes a modification to instruction fetch stage 14, namely, an SBB and TR instruction detect circuit 38 is added and communicates information to BTB 28. Note also that circuit 38 is shown within stage 14 by way of example and, alternatively, could be placed in other locations with respect to pipeline 12 (for example, at execute stage 22). In any event, the purpose of this circuit is appreciated from the following discussion of FIGS. 5 through 7.

FIG. 5 illustrates a timing diagram of instruction stream 32 of FIG. 2 as it is processed in accordance with microprocessor 36 of FIG. 4. FIG. 5 also uses the same timing conventions as FIG. 3 to contrast the present embodiments with the prior art and, thus, the horizontal axis from left to right across FIG. 5 represents successive microprocessor clock cycles, while the vertical axis from top to bottom across FIG. 5 represents the passage of an instruction stream through the microprocessor pipeline.

FIG. 5 generally depicts the same processing operation as FIG. 3 as described above with respect to clock cycle 1 through 5. Thus, in clock cycle 1, instruction stream 32 is fetched by instruction fetch stage 14 from instruction cache circuit 26 as in the case of clock cycle 1 of FIG. 3. Moreover, with regard to clock cycles 2 through 5 of FIG. 5, they also depict the same processing operations as FIG. 3 described above. Thus, the reader is referred to the above discussion of FIG. 3 for details as to those clock cycles. Given the above discussion, recall also that by the conclusion of clock cycle 5 in FIG. 5 that the SBB instruction is executed and its misprediction causes a pipeline flush in response to the MISPREDICTED signal. Recall also that the ACTUAL TARGET ADDRESS is communicated to instruction fetch stage 14 so that its next fetch may be of the line including the TR instruction.

Despite the depiction of clock cycle 5 in FIG. 5, the present embodiment differs considerable at this point from the prior art in that during clock cycle 5 the SBB instruction is also determined to constitute as a short backward branch, and its target therefore is determined to be the target of a short backward branch instruction. In the preferred embodiment, this determination may be performed in various manners. To simplify the current discussion, however, a detailed discussion of such techniques is deferred until after FIG. 7. At this point, however, note that in response to the determination, SBB and TR instruction detect circuit 38 causes an entry to be made in BTB 28 designating the branch instruction as a short backward branch instruction, and further designating the TR instruction as its target. The method then proceeds to the next successive clock cycle as discussed below.

As in the case of FIG. 3, the next successive clock cycle shown within FIG. 5 is identified as clock cycle 6. However, as explained above, following a branch misprediction and pipeline flush as discussed above, often several clock cycles will elapse before the next successive fetch into the pipeline occurs. Nevertheless, again to simplify the sequential nature of actions, FIG. 5 illustrates the next clock cycle following clock cycle 5 as clock cycle 6, with it understood by a person skilled in the art that actually the fetch and subsequent steps thereafter may not commence until some later clock cycle. Turning then to clock cycle 6 of FIG. 5 (or the next cycle in which the pipeline is then ready to proceed), loop 34 is fetched by instruction fetch stage 14 from instruction cache circuit 26 generally as in the case of clock cycle 6 of FIG. 3. Thus, loop 34 is received in a line which is aligned according to its alignment from cache circuit 26. However, note two additional aspects of the present embodiments which contrast with the prior art. As a first difference in the present operation, note in the preferred embodiment that SBB and TR instruction detect circuit 38 detects that the fetched line includes an SBB instruction as well as its TR instruction. Specifically, recall from above that BTB 28 has been written to include a designation of SBB as well as its TR instruction. Thus, when these instructions are fetched by instruction fetch stage 14, they are detected as such from a look up in BTB 28. For reasons more clear below, BTB 28 also causes a tag to be added to both the SBB instruction as well as its TR instruction such that, as each such instruction passes along pipeline 14, it may be distinguishable as either an SBB or its TR instruction, and processed according to the methodology set forth below. As a second difference in the present operation, in addition to fetching loop 34, instruction fetch stage 14 also fetches any instructions after the TR instruction and in the same line from cache circuit 26. In the present example, therefore, when loop 34 is fetched, so is instruction M following loop 34.

During clock cycle 7, the fetched loop 34 as well as the additional instruction M from clock cycle 6 progress through decode stage 16 and to queue 30. When placed in queue 30, loop 34 and instruction M are re-aligned so that the TR instruction is placed at the top of queue 30. At this point, therefore, to the extent that loop 34 and any instructions following it in the same cache line have less instructions than the number of instructions which can be stored in queue 30, the remaining locations are unused (i.e., two locations in the present example). In contrast to FIG. 3, note further with respect to clock cycle 7 of FIG. 5, and as better appreciated below with respect to FIGS. 6a–6c, once queue 30 stores the entire short backward branch loop, the loop is no longer re-fetched in the manner as in the prior art. Instead, queue 30 is effectively locked into a state such that the loop remains therein for reasons more clear below. Moreover, as opposed to the prior art, during clock cycle 7, the next eight fetched instructions following instruction M are fetched, and are shown as instructions N through U at the fetch stage during clock cycle 7.

The operation of schedule stage 18 during clock cycle 8 of FIG. 5 demonstrates another contrasting feature of the present embodiment to the prior art operation shown in FIG. 3. Specifically, during clock cycle 8 queue 30 outputs to schedule stage 18 a full eight execution unit instructions for scheduling. Thus, by the end of clock cycle 8, schedule stage 18 may schedule not only each execution unit instruction for the first iteration of loop 34, but it may further schedule the beginning ones of those execution unit instructions corresponding to the next (i.e., second) iteration of loop 34. This contrast is shown in FIG. 5 by adding sequential numbers to the letter abbreviations used prior to this point Specifically, the first five entries scheduled by schedule stage 18 during clock cycle 8 are shown as TR1, A1, B1, C1, and SBB1, each corresponding to the first iteration of loop 34, while the next three entries are shown as TR2, A2, and B2, each corresponding to the first three execution unit instructions in the second iteration of loop 34. Returning briefly to the prior art operation of FIG. 3 during clock cycle 8, recall that queue 30 only provides up to one full loop 34 of instructions to schedule circuit 18. Therefore, only that loop (e.g., five instructions) may be scheduled and only that loop is thereafter executed in a single clock cycle (e.g., during clock cycle 10 in FIG. 3). However, in the instance of scheduling short backward branch loop instructions in the present embodiments, and using circuitry such as that shown in FIG. 6a, below, queue 30 makes loop 34 available to schedule stage 18 in a circular fashion to increase the number of execution unit instructions to be scheduled beyond the mere number of execution unit instructions in a single iteration of the loop. In other words, if the loop contains fewer execution unit instructions than the number which may be scheduled, then each execution unit instruction of the loop is circularly available by queue 30 for scheduling during the same clock cycle up to the maximum number of execution unit instructions to be scheduled. In the present example, therefore, loop 34 contains five execution unit instructions while schedule stage 18 may schedule up to eight execution unit instructions for up to eight execution units. Thus, when the first iteration of execution unit instructions (i.e., T1 through SBB1) is provided by queue 30 to schedule stage 18 for scheduling to five corresponding execution units, this leaves three additional execution units to which schedule stage 18 may schedule execution unit instructions. Consequently, during the same clock cycle that the first iteration (i.e., T1 through SBB1) is provided by queue 30, queue 30 also provides the next three successive instructions (i.e., T2 through B2) to schedule stage 18 for scheduling to corresponding execution units. As a result, by the end of clock cycle 8 in FIG. 5, a total of eight execution unit instructions are scheduled. Lastly, note that a microprocessor implementing the preferred method necessarily also includes register renaming, and/or some other type of out-of-order execution technique to allow the subsequent execution of the short backward branch execution unit instructions at the same time while preserving proper operands and results.

Before discussing clock cycle 9, note also the operation during clock cycle 8 with respect to decode stage 16. This operation is best recognized by comparing the information at decode stage 16 following clock cycle 8 versus that following clock cycle 7. Specifically, after clock cycle 8, each location of queue 30 stores a decoded instruction. In the present example, decoded instructions N and O are added after decoded instruction M. Note further that this operation is possible because, recalling from clock cycle 7, the present embodiments fetched the next line of instructions following the line which included the short backward branch loop. As a result and as better appreciated below, once the short backward branch loop is exited (i.e., no longer taken), these next successive instructions are already partially processed through the pipeline and, therefore, need not be fetched as in the case of the prior art after it flushes the pipeline in its entirety.

During clock cycle 9 operations take place with respect to operand read stage 20 and separately with respect to schedule stage 18. As to operand read stage 20, operands are read for the execution unit instructions which were scheduled during clock cycle 8 (i.e., TR1 through SBB1, and TR2 through B2), and for which such operands are necessary. As to schedule stage 18, note now that it schedules the next successive loop instructions following those scheduled during clock cycle 8 and, once an iteration of the loop is complete, still additional instructions from the next iteration are made available by queue 30 to schedule stage 18 for scheduling. In other words, recall during clock cycle 8 that execution unit instructions TR1 through BR1 and TR2 through B2 were scheduled. Thus, those execution unit instructions corresponded to a first full iteration of loop 34 as well as the first three of five execution unit instructions of the second iteration of loop 34. Continuing in the sequence, therefore, during clock cycle 9, the remaining execution unit instructions from the second iteration of loop 34 are scheduled (i.e., C2 and SBB2), as are five execution unit instructions from the third iteration of loop 34 (i.e., TR3 through SBB3), as is the first execution unit instruction from the fourth iteration of loop 34 (i.e., TR4).

During clock cycle 10, each execution unit of execution stage 22 executes a corresponding execution unit instruction. From FIG. 5, it will be appreciated that this operation executes the first iteration of loop 34 (i.e., T1 through SBB1). However, the three remaining execution units also have been scheduled to execute part of the second iteration of loop 34. Thus, during the same clock cycle 10, those three remaining execution units execute TR2 through B2. At this point, therefore, one skilled in the art should appreciate that the present embodiment executes more than one iteration of the short backward branch loop in a single execution cycle. For example, in the present instance, a first entire iteration plus an additional 3/5 (i.e., three of the five loop instructions) of the next iteration of the loop are executed, such that a total of 1.6 iterations (i.e., more than one iteration) are executed in a single cycle. Lastly with respect to these execution unit instructions, and although not shown in FIG. 5, following clock cycle 10 each execution unit instruction graduates and takes its affect on the architected state of the microprocessor.

Given the operation described immediately above with respect to clock cycle 10, it is now instructive to further define what is included within the term short backward branch instruction loop as used in this document. Briefly, recall from above that it was stated that such a loop includes a branch instruction which, when taken, returns control to a target instruction which precedes the branch instruction by some relatively small number of execution unit instructions. Having now appreciated the operation in FIG. 5 during clock cycle 10, it is noted that the number of execution unit instructions in a short backward branch should be less than the number of storage cells from which instructions may be scheduled, that is, the number of storage cells in queue 30. In other words, and as demonstrated by way of an another embodiment below in FIG. 7, the present embodiments each share in common the ability to provide a circular output from queue 30 to attempt to maximize instruction execution units which are operable to execute in a single cycle. Thus, above is presented an example of a decode queue 30 with eight cells, and a short backward branch loop with less than eight (e.g., five) execution unit instructions. Given the circular nature of the output of queue 30 once it stores the short backward branch, it in combination with schedule stage 18 is able to cause use of each of the execution units for a given clock cycle. Moreover, given these considerations, note further that the short backward branch loop could include up to seven execution unit instructions. In such an instance and using the present embodiments, a first iteration of each of the seven execution unit instructions could be scheduled for execution in the same clock cycle as the first execution unit instruction of the second iteration of the loop. Moreover, if the number of queue cells is increased to an integer Q, a short backward branch instruction loop for use in such an instance would consist of Q-1 or less execution unit instructions, again providing the opportunity to schedule more than one iteration of those Q-1 (or less) instructions in a single execution cycle.

Returning now to clock cycle 10 of FIG. 5, note also that the instructions scheduled by schedule stage 18 in clock cycle 9 pass to operated read stage 20. Moreover, one skilled in the art will appreciate that in the next clock cycle (i.e., clock cycle 11), these instructions are executed, thereby representing completion of the execution of the second iteration of loop 34 (i.e., by executing C2 and SBB2), complete execution of the third iteration of loop 34 (i.e., by executing TR3 through SBB3), and partial execution of the fourth iteration of loop 34 (i.e., by executing TR4). Again, therefore, more than one iteration of the short backward branch loop is executed in a single cycle.

Having described clock cycle 10, note further that the process continues through clock cycle 11 as well as any additional clock cycles required to execute the desired number of iterations of the short backward branch. Thus, while TR1 through B2 were executed during clock cycle 10, the next successive eight execution instructions (i.e., C2 through TR4) are executed during clock cycle 11. Thus, if clock cycle 12 were shown, it would execute at least A4 through SSB4, and further would execute through C5 provided the branch continued to be taken.

Note now the effect of exiting the short backward branch loop given the present embodiments. Specifically, the above noted that if clock cycle 12 were shown, it would execute at least A4 through SSB4. Suppose further, however, that SSB4, when executed, were found to be not taken. Thus, a misprediction would occur and the next instruction desired for execution would be that following the SSB instruction, that is, instruction M as shown in clock cycle 6 to follow immediately after the SSB instruction. In the prior art, when a misprediction occurs, the entire pipeline is flushed and the next instruction following the branch (e.g., instruction M) is then fetched and passes along the pipeline toward execution. In contrast, however, in the present embodiment, note that the next successive instruction is already fetched into the pipeline, decoded, and stored in queue 30. For example, looking to clock cycle 11 (or any of clock cycles 7 through 10), queue 30 is shown to already store decoded instruction M as well as instructions N and O. Thus, in the event of a misprediction of SSB4 as stated above, the pipeline of the present embodiment already stores the next instruction and possibly additional successive instructions in decoded form and it (or they) may be forwarded for scheduling in the next clock cycle without having to re-fetch those instructions following the pipeline flush. Thus, if a misprediction occurred in clock cycle 11, instructions M through O could be ready for execution only three clock cycles later, whereas in the prior art two additional clock cycles would be necessary to first fetch and second decode instruction M. Thus, the present embodiments improve further upon the prior art based on a short backward branch exit as well.

Figure 6A:
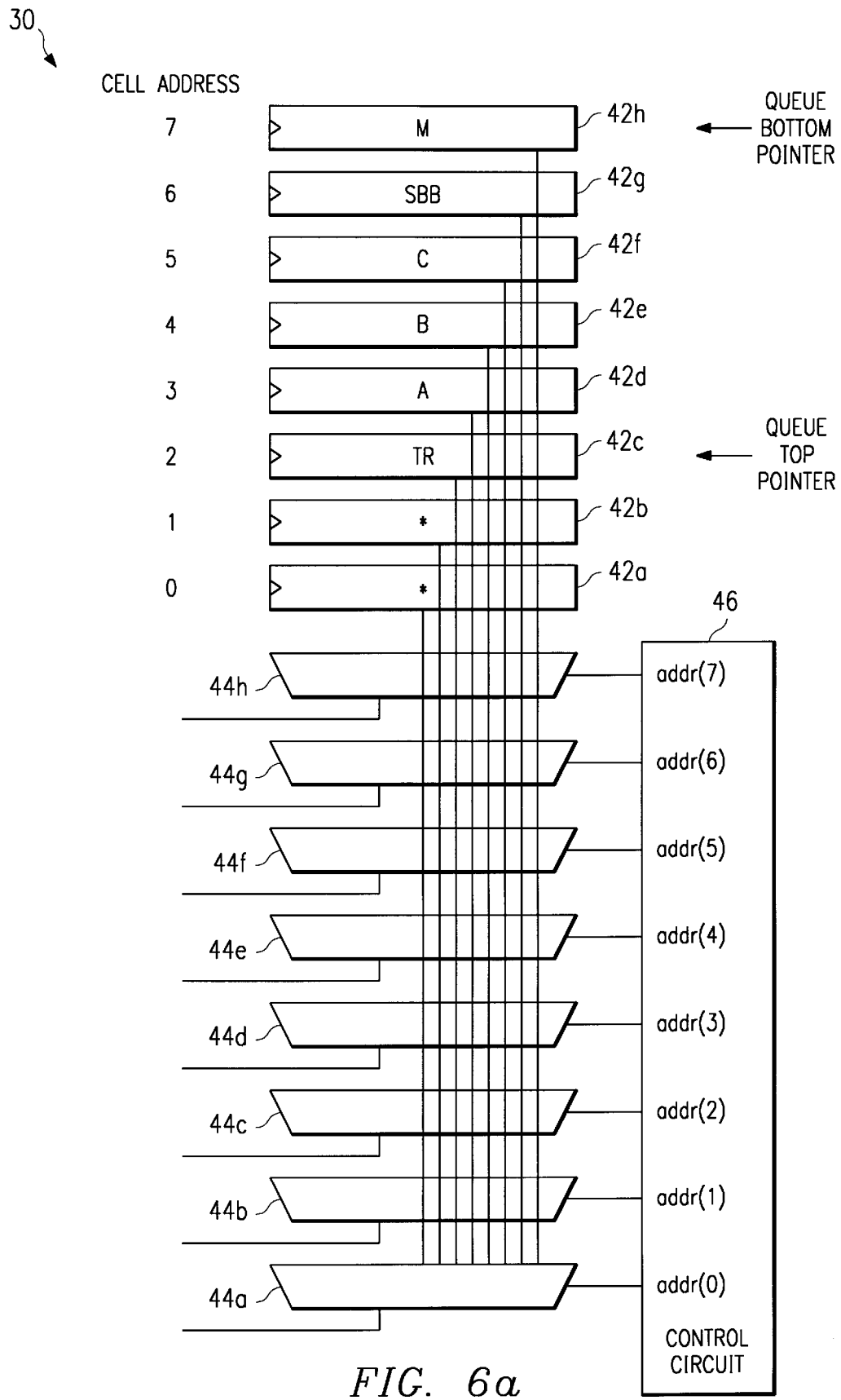
FIG. 6a illustrates a schematic of a queue circuit for providing short backward branch instructions from queue 30 to schedule stage 18 of FIG. 4.

FIG. 6a illustrates a preferred embodiment schematic of queue 30 in greater detail including the circuitry for providing execution unit instructions to schedule stage 18 in the circular manner described above. Queue 30 includes eight storage cells, with each designated with a reference numeral of 42 combined with a successive letter "a" through "h." Each cell is operable to store and output a corresponding execution unit instruction received from decode stage 16 (although inputs to the cells are not shown to simplify the Figure). Each cell 42a through 42h also has a corresponding cell address for purposes of address calculation described below. Further, in the preferred embodiment, an execution unit instruction once stored in a cell does not move to a different cell; instead, pointers are used to identify the top of the queue and the bottom of the queue, thereby providing a reference for the order in which each execution unit instruction was received. Thus, for sake of example, the execution unit instructions from clock cycle 6 of FIG. 5 are shown stored in cells 42c through 42h. Because execution unit instruction TR is the first in the sequence, it is pointed to by the queue top pointer. Similarly, because execution unit instruction M is the last in the sequence, it is pointed to by the queue bottom pointer.

The output of each of cells 42a through 42h is connected to an input of each of eight multiplexers designated 44a through 44h. Multiplexers 44a through 44h provide respective outputs to schedule stage 18. More specifically, each of multiplexers 44a through 44h are controlled by a control circuit 46, which is activated in response to the tag associated with the SSB and TR execution unit instructions as introduced in connection with FIG. 4. In other words, recall that in response to the indication in BTB 28 that an instruction is an SBB instruction, a tag is added to each instruction to indicate to subsequent pipeline stages that the bits represent an SBB instruction (or its corresponding TR instruction). At this point, in response to the tag, control circuit 46 may accomplish the following functionality to process multiple iterations of loop 34. More specifically, once control signal 46 detects the SBB tag, it calculates the cell address for each multiplexer to select its execution unit instruction based on the following Equation 1:

$$addr(n)=(((n+curr\_br) mod\ br\_q\_sz)+top\_of\_q) mod\_q\_sz) \quad \text{Equation 1}$$

where, addr(n) is the address of a multiplexer as indicated in FIG. 6a;

curr_br is zero for the first iteration of a short backward branch loop, and for each cycle thereafter is (curr_br in the preceding cycle+the number of instructions scheduled in the last cycle) mod br_q_z;

br_q_sz is the number of instructions in the short backward branch loop;

top_of_q is the cell address for the queue top pointer; and q_sz is the total number of cells of the instruction queue (eight in the current example).

Figure 6B:
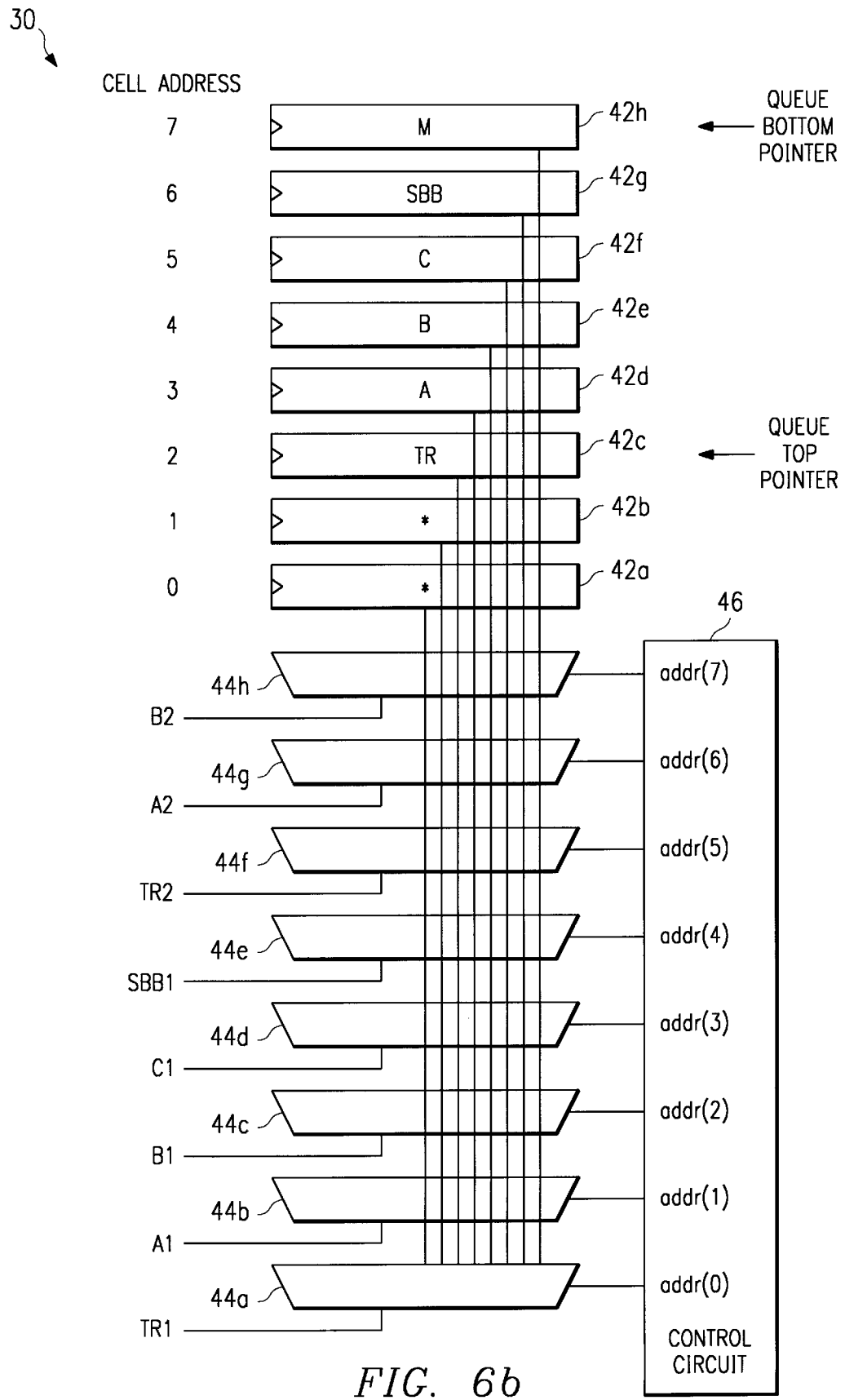
FIG. 6b illustrates the schematic of FIG. 6a after providing loop instructions to schedule stage 18 for scheduling during clock cycle 8 of FIG. 5.

FIG. 6b illustrates the system of FIG. 6a, but further depicts the output of each multiplexer 44a through 44h to demonstrate the operation of control circuit 46 to provide execution unit instructions from loop 34 in a continuous fashion. Following the above example, since the execution unit instructions shown in queue 30 are that of clock cycle 6 in FIG. 5, then the execution unit instructions shown output by each multiplexer are those processed by schedule stage 18 in clock cycle 8 in FIG. 5 (i.e., in sequence, TR1 through SBB1 and TR2 through B2). Given this ordering, a few examples of the calculation of Equation 1 are now demonstrated to more fully appreciate its application.

As a first example of the application of Equation 1, consider the execution unit instruction to be passed by queue 30 to the first schedule stage location (i.e., addr(0)). Equation 1 then calculates as:

$$addr(0)=(((+0) mod\ 5)+2) mod\ 8=((0\ mod\ 5)+2) mod 8=2 mod\ 8=2$$

Therefore, the execution unit instruction from cell address 2 (i.e., corresponding to cell 42c) is passed to addr(0) of schedule stage 18, thereby presenting execution unit instruction TR to the first schedule stage location.

As a second example of the application of Equation 1, consider the execution unit instruction to be passed by queue 30 to the fifth schedule stage location (i.e., addr(4)). Equation 1 then calculates as:

$$addr(4)=(((4+0) mod 5)+2) mod 8)=((4 mod 5)+2) mod 8=6 mod 8=6$$

Therefore, the execution unit instruction from cell address 6 (i.e., corresponding to cell 42g) is passed to addr(4) of schedule stage 18, thereby presenting execution unit instruction SBB to the fifth schedule stage location.

As a third example of the application of Equation 1, consider the execution unit instruction to be passed by queue 30 to the sixth schedule stage location (i.e., addr(5)). Equation 1 then calculates as:

$$addr(5)=(((5+0) mod 5)+2) mod 8)=((5 mod 5)+2) mod 8=2 mod 8=2$$

Therefore, the execution unit instruction from cell address 2 (i.e., corresponding to cell 42c) is passed to addr(5) of schedule stage 18, thereby presenting execution unit instruction TR to the sixth schedule stage location.

Figure 6C:
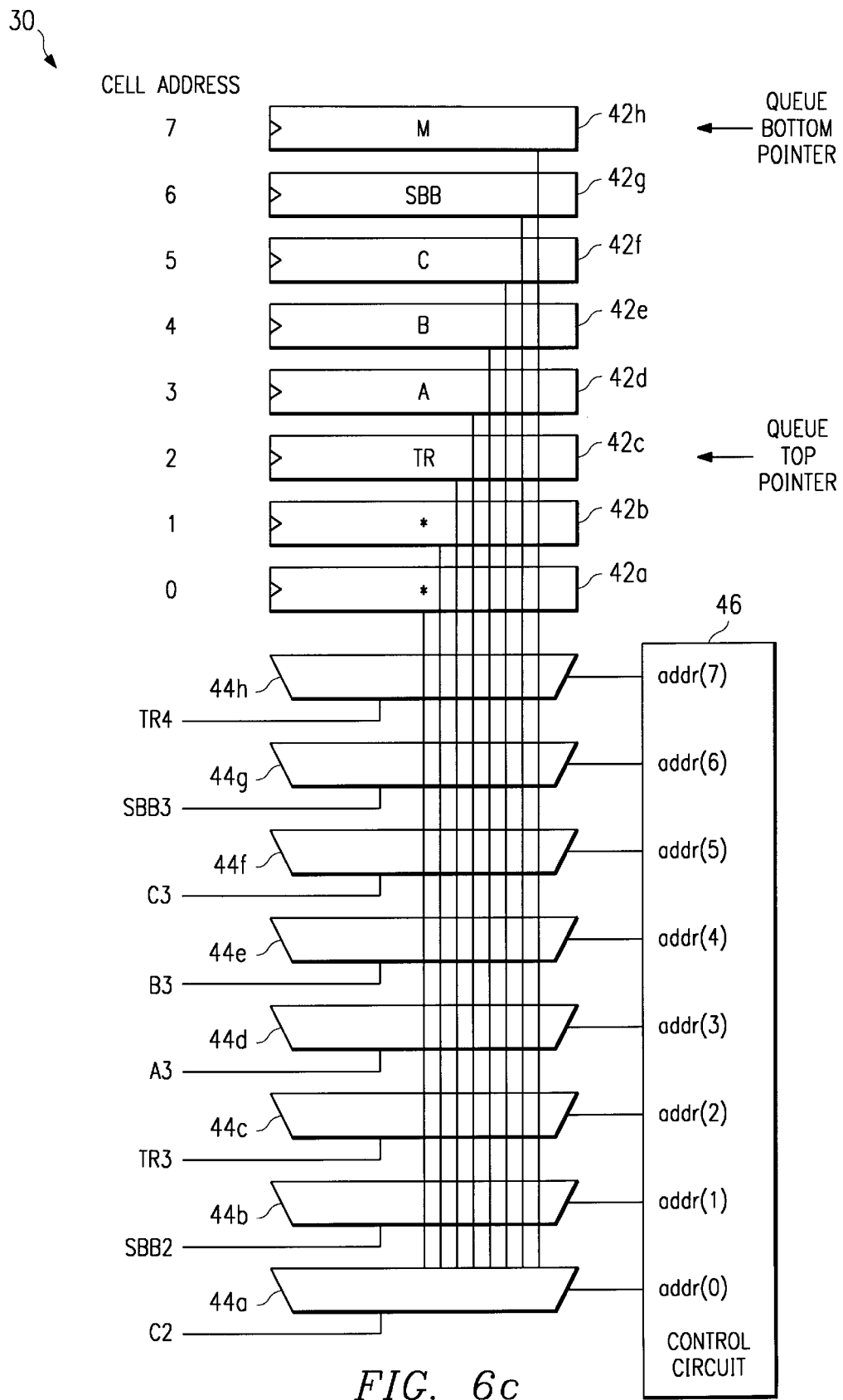
FIG. 6c illustrates the schematic of FIG. 6a after providing loop instructions to schedule stage 18 for scheduling during clock cycle 9 of FIG. 5.

To demonstrate still additional applications of Equation 1, FIG. 6c duplicates FIG. 6b, but demonstrates the desired outputs of each of multiplexers 44a through 44h for clock cycle 9 from FIG. 5 (i.e., one clock cycle following the demonstration of FIG. 6b). Thus, the execution unit instructions shown output by each multiplexer for clock cycle 9 in FIG. 5 are C2 and SBB2, followed by TR3 through SBB3, and finally followed by TR4. Given this ordering, a few examples of the calculation of Equation 1 are now demonstrated to more fully appreciate its application. Before proceeding with examples of Equation 1 with respect to FIG. 6c, recall that each of application of Equation 1 involves the parameter curr_br, and it is stated above that for each cycle after the first iteration of the loop that curr_br is (curr_br in the preceding cycle+the number of instructions scheduled in the last cycle) mod br_q_z. In the following example, therefore, curr_br is:

$$curr\_br=(0+8) mod\ 5=3$$

Turning then to a first example of the application of Equation 1, consider the execution unit instruction to be passed by queue 30 to the first schedule stage location (i.e., addr(0)). Equation 1 then calculates as:

$$addr(0)=(((0+3) mod 5)+2) mod 8)=((3 mod 5)+2) mod 8=5 mod 8=5$$

Therefore, the execution unit instruction from cell address 5 (i.e., corresponding to cell 42f) is passed to addr(0) of schedule stage 18, thereby presenting execution unit instruction C to the first schedule stage location.

As a second example of the application of Equation 1, consider the execution unit instruction to be passed by queue 30 to the second schedule stage location (i.e., addr(1)). Equation 1 then calculates as:

$$addr(1)=(((1+3)mod5)+2)mod8=((4mod5)+2)mod8=6mod8=6$$

Therefore, the execution unit instruction from cell address 6 (i.e., corresponding to cell 42g) is passed to addr(1) of schedule stage 18, thereby presenting execution unit instruction SBB to the second schedule stage location.

As a final example of the application of Equation 1, consider the execution unit instruction to be passed by queue 30 to the eighth schedule location (i.e., addr(7)). Equation 1 then calculates as:

$$addr(7)=(((7+3)mod5)+2)mod8=((10mod5)+2)mod8=2mod8=2$$

Therefore, the execution unit instruction from cell address 0 (i.e., corresponding to cell 42c) is passed to addr(7) of schedule stage 18, thereby presenting execution unit instruction TR to the eighth schedule stage location.

FIG. 7 illustrates a timing diagram of an alternative instruction stream, similar to that of stream 32 of FIG. 2, as it is processed in accordance with a modification to the microprocessor 36 of FIG. 4. First, note that the instruction stream of FIG. 7 also includes a short backward branch loop, but to further demonstrate the above principles, the loop now includes ten execution unit instructions, including the following format from earliest to latest:

TR A B C D E F G H SSB

In addition, note it is stated immediately above that the processing depicted by FIG. 7 applies to a modification of microprocessor 36. Specifically, in the present example, the number of storage cells in queue 30 (i.e., cells capable of storing a corresponding execution unit instruction) is increased from eight to twelve. However, the microprocessor continues to include eight execution units.

To simplify the following discussion, FIG. 7 also uses the same tiring conventions as FIG. 5 with the horizontal axis from left to right across FIG. 7 representing successive microprocessor clock cycles, while the vertical axis from top to bottom across FIG. 7 represents the passage of an instruction stream through the microprocessor pipeline. Moreover, to further simplify the discussion, it is assumed that the branch loop of FIG. 7 has already been detected by virtue of a misprediction and, therefore, clock cycle 10 is arbitrarily designated as the first clock cycle where fetching of the target and successive instructions begin (i.e., analogous to clock cycle 6 of FIG. 5). In other words, by the conclusion of clock cycle 9 (not shown), the SBB instruction is executed and its misprediction causes a pipeline flush in response to the MISPREDICTED signal. Recall also that the ACTUAL TARGET ADDRESS is communicated to instruction fetch stage 14 so that its next fetch may be of the line including the TR instruction. Lastly, recall that the SBB is designated as a short backward branch in BTB 28, and it target is designated as the target of a short backward branch as well.

Turning then to clock cycle 10 of FIG. 7, some of the first of the ten instructions in the present loop are fetched by instruction fetch stage 14. These first instructions are received in a line which is aligned according to its alignment from cache circuit 26. In the current example, assume that the loop is aligned such that the first two instructions fetched from the cache line are not part of the loop and, therefore, are shown as asterisks in clock cycle 10. Moreover, because the entire loop is ten instructions long, because the loop is displaced by two non-loop instructions in the cache line, and because the fetch stage may only fetch eight instructions at a time, then only six of the ten loop instructions are fetched during clock cycle 10. The remaining instructions of the loop, therefore, are fetched during clock cycle 11, discussed below. Continuing with clock cycle 10, again BTB 28 (or some other storage such as a target storing register associated with it) is consulted and indicates that the TR instruction is the target of an SBB instruction and, thus, a tag indicating this is added to or associated with the TR instruction to designate it as such as it passes through pipeline 14.

During clock cycle 11, and as suggested above, the remaining four instructions of the present loop are fetched by fetch stage 14. In addition, and as in the case of clock cycle 6 of FIG. 5, in addition to completing the fetch of the loop, instruction fetch stage 14 also fetches any instructions after the TR instruction and in the same line from cache circuit 26. In the present example, therefore, when the final instructions of the loop are fetched in clock cycle 11, so are instructions M. N, 0, and P following the loop. Moreover, since the SBB instruction is now fetched, it also is tagged as a short backward branch due to the corresponding entry in BTB 28. Also during clock cycle 11, the first six instructions of the fetched loop progress through decode stage 16 and to queue 30. When placed in queue 30, these first loop instructions are re-aligned so that the TR instruction is placed at the top of queue 30. At this point, therefore, to the extent that the first instructions of the loop have less instructions than the number of instructions which can be stored in queue 30, and to the extent those first instructions were displaced within the cache line from which they were read, the remaining locations in queue 30 are unused (i.e., six locations in the present example).

During clock cycle 12, note now that decode stage 16 further decodes the remaining instructions of the present short backward branch loop, and stores those decoded execution unit instructions in queue 30. Thus, after clock cycle 12, schedule stage 18 may receive the execution unit instructions in circular fashion in a manner comparable to that described above in connection with FIGS. 5 through 7, and as demonstrated below.

During clock cycle 13, schedule stage 18 receives the execution unit instructions from queue 30 in a circular fashion. Therefore, schedule stage 18 issues for execution the maximum number of instructions possible, that is, the number of instructions corresponding to the number of available execution units. In the current example, eight execution units are available; therefore, TR1 through G1 are scheduled for execution. Given the depiction of clock cycle 13, note therefore that a one clock delay has occurred before scheduling of the loop commenced. Specifically, note during clock cycle 12 that no scheduling is shown, even though execution unit instructions were stored in queue 30 during clock cycle 11. Therefore, in an alternative embodiment to that shown in FIG. 7, rather than waiting to schedule a full eight execution unit instructions during clock cycle 13, the execution unit instructions stored in queue 30 during clock cycle 11 could be scheduled during clock cycle 12. However, in such a case, only six execution unit instructions (i.e., TR through El) would then be available for scheduling and would pass through the pipeline to be executed as only six instructions in clock cycle 14. To simplify the current explanation, therefore, the pattern of FIG. 7 is instead discussed below.

During clock cycle 14, schedule stage 18 again receives the execution unit instruction from queue 30 instructions in a circular fashion. Here, however, because the first eight of ten instructions in the present loop were received and scheduled by stage 18 during the preceding clock cycle 13, the present clock cycle 14 receives and schedules the remaining execution unit instructions in the first iteration of the loop (i.e., H1 and SSB1), as well as the first six execution unit instructions for the next iteration of the loop (i.e., TR2 through E2).

Given the above, one skilled in the art will appreciate that after clock cycle 12, eight execution unit instructions may be scheduled every clock cycle thereby permitting each execution unit to be assigned an instruction until all desired iterations of the present loop are complete. Once again, therefore, the execution units are not left idle as would be the case in the prior art. Indeed, given the example of a ten instruction loop as cache-aligned in the manner shown in FIG. 7, note that the prior art would alternate to fetch a first group of instructions corresponding to a first cache line (including instructions TR through instruction E) followed by a second group of instructions corresponding to a second cache line (including instructions F through SSB), and each time allow those to pass through the pipeline. Consequently, at execution time, each iteration of the loop would require two clock cycles, one cycle for each group of fetched instructions. Moreover, during the first of these clock cycles two of the execution units would not be used (because only six instructions would be executed using only six of the eight execution units), and during the second of these clock cycles four of the execution units would not be used (because only four instructions would be executed using only four of the eight execution units). In contrast, the present inventive embodiment fully utilizes available execution units when executing a short backward branch loop. Thus, again the alternative embodiment of FIG. 7 represents increased performance over the prior art.

Given the operation described immediately above, it is once again helpful to review in the present embodiment what is included within the term short backward branch instruction loop as used in this document. Recall from above that it was stated that the number of execution unit instructions in a short backward branch should be less than the number of storage cells from which instructions may be scheduled, that is, the number of storage cells in queue 30. In this regard, the alternative embodiment of FIG. 7 demonstrates twelve storage cells, and a ten instruction loop. Again, the relative basis permits circular issuance of instructions to the execution units, thereby permitting up to all execution units to execute a portion of a short backward branch loop in a single cycle. In addition, note now other common aspects of operation of FIGS. 5 and 7. Specifically, in both instances, a short backward branch is detected, decode queue 30 stores the entire loop of the short backward branch instructions over various iterations without having to re-fetch those iterations, and numerous iterations of a short backward branch loop are executed over numerous clock cycles. Moreover, during those clock cycles, each of the execution units is preferably able to execute a corresponding execution unit instruction rather than being idle because of a lack of available execution unit instructions to schedule for execution. Still further, in various ones of those clock cycles, during a given clock cycle, certain execution unit instructions being executed represent one iteration of the loop while other execution unit instructions being executed in the same cycle represent either a preceding or following iteration of the loop. In this last regard, for example, during clock cycle 10 of FIG. 5, TR1 through SBB1 represent the first iteration of the loop, while TR2 through B2 represent the second iteration of the loop. Similarly, in FIG. 7, during clock cycle 16, H1 through SSB1 represent the first iteration of the loop, while TR2 through E2 represent the second iteration of the loop. Lastly, and as further appreciated below, over the entire set of clock cycles used to execute all iterations of the short backward branch loop, the average number of unused execution units is less than the average number of unused execution units in the prior art.

As noted immediately above, various observations about the short backward branch may have been made given the preferred implementation described. Having now presented those observations, the inventive scope may be further characterized by contrasting the operation of the FIG. 5 and 7 demonstrations with that of the prior art illustration of FIG. 3, and by re-visiting some of the assumptions made above. As mentioned above, in the present embodiments, the average number of unused execution units is less than the average number of unused execution units in the prior art. This aspect is now explored with a more concentrated analysis of the above descriptions. To better understand the following, an introduction is now made to what is referred to hereafter as execution unit time slots. Specifically, an execution unit time slot is the availability of an execution unit for a single clock cycle to execute an execution unit instruction. For example, in numerous instances above, it was assumed that an execution unit instruction is executed during a single clock cycle; in this instance, it may now be said that such an event consumes a single execution unit time slot. Similarly, if that same execution unit instruction required two clock cycles to execute, it is said that such an event consumes two execution unit time slots. Still further, however, note that even if the execution unit does not execute an execution unit instruction during a given cycle, the execution unit time slot still elapses. In other words, the execution unit time slot represents the availability to execute during a given clock cycle, regardless of whether the implementation actually takes advantage of that availability and executes during that slot. This concept of execution time slots permits a focused analysis of the present embodiments over the prior art, as further explored below.

In the prior art, the number of execution unit time slots elapsing during the execution of an iteration of a short backward branch loop, EUTSI, may be defined as in the following Equation 4:

$$EUTSI = NEU * CFI \qquad \text{Equation 4}$$

where,

NEU equals the number of execution units in the microprocessor; and

CFI equals the number of clock cycles to fetch one iteration of the short backward branch loop.

For example, Equation 4 applies to FIG. 3 as follows. First, FIG. 3 depicts a microprocessor having eight execution units. Second, the short backward branch loop is within a single cache line and, therefore, may be fetched in a single clock cycle. Therefore, applying Equation 4 to the prior art operation of FIG. 3 yields:

$$EUTSI = NEU * CFI = 8 * 1 = 8$$

Consequently, eight execution unit time slots elapse for a clock cycle which executes one iteration of the short backward branch. This mathematically demonstrates that even though only five execution unit instructions are executed for a single execution clock cycle in FIG. 3 (e.g., clock cycle 10), a total of eight execution unit time slots elapse. Thus, three of those time slots go unused and, therefore, are wasted because three of the eight execution units are idle during that clock cycle.

As another example of Equation 4, if the short backward branch loop of FIG. 7 were processed by the prior art (as opposed to under the invention as shown in FIG. 7), the result of Equation 4 is as follows. Again, FIG. 7 depicts a microprocessor having eight execution units. However, the short backward branch loop is within two cache lines and, therefore, would be fetched in two clock cycles. Therefore, applying Equation 4 to a prior art processing of the short backward branch yields:

$$EUTSI = NEU*CFI = 8*2 = 16$$

Consequently, sixteen execution unit time slots elapse over two clock cycles to execute one iteration of the short backward branch. This mathematically demonstrates that even though only ten execution unit instructions are executed over two execution clock cycle, a total of sixteen execution unit time slots elapse. Thus, six of those time slots go unused and, therefore, are wasted by the end of the execution of one iteration of the loop.

In contrast to the prior art, the preferred embodiments described above present a configuration and methodology providing the ability to execute a short backward branch in a manner which, for a single iteration of the loop, uses less execution unit time slots than the prior art. Therefore, the remaining execution unit time slots may be used to execute a portion or all of another iteration of the loop. As detailed below, under the present embodiments, the number of execution unit time slots required for an iteration of a short backward branch loop, $EUTSI_{INV}$, may be defined as in the following Equation 5:

$$EUTSI_{INV} = \sum_{i=1}^{L} \sum_{j=1}^{EUC_i} CE_{i,j} \qquad \text{Equation 5}$$

where,

L is the number of instructions in the short backward branch loop;

EUC is the number of execution units consumed to execute an instruction (i.e., number of execution unit instructions per instruction); and CE is the number of clocks to execute an execution unit instruction and, therefore, $CE_{i,j}$ is the number of clocks to execute the $j^{th}$ execution unit instruction corresponding to the $i^{th}$ instruction in the loop.

Note that the parameters of Equation 5 further account for some of the assumptions made above with respect to FIGS. 5 and 7. For example, with respect to EUC, the earlier discussion assumed that each instruction (before decoding) corresponded to a single execution unit instruction (after decoding). Therefore, it was the case that each instruction would only consume one execution unit for execution. However, some instructions may decode to two (or more) execution unit instructions and, therefore, will consume a corresponding number of execution units to execute. As another example, it is implied in the illustration of FIGS. 5 and 7 that once the execution unit instruction reaches the execute stage, it is necessarily executed in the next clock cycle. However, in some instances, such as pipeline stalls, interlocks, or other events known in the art, a delay may actually occur before the execution unit instruction is executed; still further, the value of CE might depend on the particular execution unit instruction. Therefore, the parameter CE in Equation 5 may accommodate such a delay. For example, if a stall occurred for a given execution unit instruction so that it required two clocks to execute, then Equation 5 accounts for such an event during that iteration. In any event, for a short backward branch loop, for those instances where the circuits and method of operation discussed above cause Equation 5 to realize a total number of time slots less than that of Equation 4, a benefit is realized in accordance with the present embodiments. To further demonstrate this, note that Equation 5 applies to FIG. 5 as follows:

$$EUTSI_{INV} = CE_{1,1} + CE_{2,1} + CE_{3,1} + CE_{4,1} + CE_{5,1} = 1+1+1+1+1 = 5$$

In other words, for each instruction $CE_1$ through $CE_5$, it has only one execution unit instruction, and for each of those execution unit instructions, it was assumed in FIG. 5 that only one clock cycle is used to execute the execution unit instruction. Thus, given the above, Equation 5 as applied to FIG. 5 demonstrates that the average number of execution unit time slots required during an iteration of the FIG. 5 short backward branch loop is only 5. Recall, however, that for processing the same loop using the prior art as in FIG. 3 results in a number of 8 such time slots. Therefore, the present embodiments are considerably more efficient. As another demonstration, note that Equation 5 applies to FIG. 7 as follows:

$$EUTSI_{INV} = CE_{1,1} + CE_{2,1} + CE_{3,1} + CE_{4,1} + CE_{5,1} + CE_{6,1} + CE_{7,1} + CE_{8,1} + CE_{9,1} + CE_{10,1} = 1+1+1+1+1+1+1+1+1+1 = 10$$

Given the above, Equation 5 as applied to FIG. 7 demonstrates that the average number of execution unit time slots required during an iteration of the FIG. 7 short backward branch loop is only 10, whereas if the same loop were processed using the prior art then Equation 4 results in a use of 16 time slots. Again, therefore, for a single iteration, fewer execution unit time slots are required.

To still further appreciate the effect of Equation 5, assume lastly a short backward branch loop having two instructions (i.e., only a branch and its target), where the first instruction decodes into three execution unit instructions and the second instruction decodes into two execution unit instructions. Assume further in this example that the number of clocks to execute each corresponding execution unit instruction are as shown in the following Table 1:

TABLE 1

| Instruction number | Execution unit instruction | Number of clock cycles to execute execution unit instruction |
|---|---|---|
| 1 | 1 | 1 |
| 1 | 2 | 1 |
| 1 | 3 | 2 |
| 2 | 1 | 2 |
| 2 | 2 | 3 |

Applying Equation 5 to Table 1, therefore, yields:

$$EUISI_{INV} = (CE_{1,1} + CE_{1,2} + CE_{1,3}) + (CE_{2,1} + CE_{2,2}) = (1+1+2) + (2+3) = 9$$

Given the above, Equation 5 as applied to the loop of Table 1 demonstrates that the inventive apparatus and methodology provided above can yield an average number of nine execution unit time slots elapsing during an iteration of the short backward branch loop.

Lastly, the contrast of Equations 4 and 5 demonstrates operation for a single iteration of a loop. However, for multiple iterations of the same loop, averages may be calculated again to demonstrate the relative improvements provided by the present embodiments. For example, Equation 4 and the illustration of FIG. 3 suggests that, even in the best case of one execution unit instruction per instruction, that on average three time slots are unused for all iterations of the loop. Of course, in some circumstances, such as a stall or the like, for a single iteration it may be the case that more than five execution units are used and, therefore, less than three execution units are unused. On average, however, one skilled in the art will appreciate that at least three execution units are unused. In contrast, Equation FIG. 5 demonstrate an alternative whereby fewer execution time slots may be used for a single iteration of the loop. Indeed, again considering the case of an average over all iterations of the loop, note in certain clock cycles the parameters may indicate that, for that iteration, an additional time slot is used to execute the iteration. However, taking an average of all iterations of the loop, processing in accordance with the present embodiments causes a lesser number of time slots to elapse in completing all iterations of the loop.

Having demonstrated the preferred pipeline operation in processing a short backward branch loop, recall it was stated earlier that, in performing such operation, the SBB instruction is determined to be a short backward branch at the time it first passes through the pipeline and is found mispredicted (or not predicted, meaning, having no entry in BTB 28). In the preferred embodiment, this determination may be performed in various manners, and using SBB and TR detect circuit 38 either alone or in combination with the functionality included in execute stage 22. In any event, various examples of the determination are presented below.

SBB detection is fairly straightforward in the case where the present embodiments are implemented in a RISC microprocessor, and where each RISC instruction corresponds to a single execution unit instruction. First, recall that the branch instruction is first executed when it is either mispredicted or there is no entry in BTB 28, such as in clock cycle 5 of FIG. 5. At this point, the branch handling circuitry of the appropriate execution unit responds with the signals set forth above (i.e., ACTUAL TARGET ADDRESS, INSTRUCTION ADDRESS, MISPREDICTED). Thus, note that the execution unit has available to itself both the address of the branch instruction as well as that of the target instruction. Therefore, two determinations may be made to determine whether the current branch instruction is an SBB instruction. First, the execution unit may determine that the target address is less than the branch instruction address; if this is the case, the branch is a backward branch. Second, the execution unit may subtract the target address from the branch instruction address. The result may then be compared to the number of storage cells in queue 30 (e.g., eight for the example of FIG. 5 and twelve for the example of FIG. 7). If the result is less than the number of storage cells in queue 30, then the branch is a short backward branch; otherwise, while the branch is a backward branch, it is not short as that term is defined in the present embodiments.

SBB detection is more complicated in the case where the present embodiments are implemented in a CISC microprocessor (or a RISC having complex decode), but two techniques are detailed below while a person skilled in the art may provide additional alternatives as well.

In a first technique for SBB detection in a CISC microprocessor, simulation or other comparable analysis may be performed to determine an average number of bytes, B, per instruction set architecture ("ISA") instruction, as well as the average number of execution unit instructions, I, per ISA instruction. Given these parameters, the average number of ISA instructions which may be stored in queue 30, QI, is determined by the following Equation 6:

$$QI = (\text{number of cells in queue 30}) \div I \qquad \text{Equation 6}$$

The result of Equation 1 is then used to determine the average number of bytes stored in queue 30, QB, according to the following Equation 7:

$$QB = QI * B \qquad \text{Equation 7}$$

Given the Equation 3 value of QB (i.e., the average number of bytes which may be stored in queue 30), again an address subtraction is used as in the case of the RISC example set forth above. In other words, the target address is subtracted from the branch address to create a difference D. Because the addresses are by byte, therefore, D represents the total number of bytes included within the loop. Thus, if D is less than QB, the backward branch is statistically likely to be a short backward branch. Note also that the above determination is only approximated statistically because the above parameters are based on averages. Thus, to further include some deviations beyond the average, in an alternative embodiment the value of QB may be increased by some factor, such as a factor on the order of 1.1, to cause more loops to be considered to be short backward branches rather than an outright comparison of QB to D. Regardless of whether QB is increased, once a branch is detected as a short backward branch, SBB and TR detect circuit 38 updates BTB 28 to indicate that the current branch instruction is an SBB instruction, and both the SBB and its corresponding TR instruction may thereafter be tagged as described above.

Given the above, note again that the calculations and SBB conclusions from Equations 6 and 7 are based on averages. Consequently, there may be instances where a branch loop identified as a short backward branch is actually larger than such a loop (i.e., the execution unit instructions corresponding to the loop are too numerous to fit within the cells of queue 30). Thus, the preferred embodiment further includes additional steps and hardware to verify the determination based on the above equations, and such steps are described below.

After BTB 28 is updated as described immediately above, recall that the pipeline then fetches the TR instruction as well as instructions following it. As this point, the TR instruction is tagged as the target of a short backward branch loop due to the entry in BTB 28 identifying it as such. Returning then to FIG. 5, recall next that TR is decoded and stored in queue 30. Once a TR instruction (which is necessarily tagged as the target of an SBB instruction) is stored in queue 30, the present embodiment further includes appropriate circuitry which detects its arrival, and performs up to two additional determinations. First, it is determined if the corresponding SBB is also within queue 30. If so, then since both the TR and SBB execution unit instructions are within queue 30, then by definition the loop is a short backward branch loop. As a result, the earlier entry into BTB 28 based on the above equations is accurate, and the method continues as illustrated in FIG. 5 (or FIG. 7). On the other hand, if the corresponding SBB is not also within queue 30, then a determination is made as to whether queue 30 is full (i.e., whether each queue location stores valid information). For example, turning to clock cycle 11 of FIG. 7, there is an instance where the TR instruction has been stored in queue 30, but queue 30 is not yet full. In such an instance, in the next clock cycle, the current execution instructions are permitted to continue along pipeline 14, but copies of them are also retained within queue 30. For each cycle thereafter, this analysis continues, that is, it is determined whether both the SBB and TR execution unit instructions are within queue 30 and, if not, whether queue 30 is full. At some point, therefore, queue 30 will fill with execution unit instructions. For example, in FIG. 7, this occurs in clock cycle 12. At this point, once again, if both the SBB and TR execution unit instructions are within queue 30, then the above determination that the loop is a short backward branch loop is accurate and processing of that loop may continue in the manner described above. On the other hand, if at the time queue 30 is full, it is determined that the SBB execution unit instruction is not within queue 30, then by definition the current loop, although identified as a short backward branch loop, is in fact not such a loop. In response, two actions are taken. First, the entry in BTB 28 indicating that the branch instruction is an SBB instruction is corrected so as not to indicate a short backward branch. Second, for those execution unit instructions that were held within queue 30 pending this determination and for which copies have already passed to subsequent pipeline stages, they are invalidated so that the next successive instructions which have not passed to subsequent pipeline stages may then proceed along the pipeline in the appropriate order.

In a second technique for SBB detection in a CICS microprocessor, the averages set forth above as well as the equations and comparisons are not used. Instead, for each backward branch instruction fetched, it is initially designated in BTB 28 as an SBB instruction. Next, the flow continues as described in the immediately preceding paragraph, that is, the arrival into queue 30 of the execution unit instruction corresponding to the target of the branch is detected. Thereafter, it is determined whether the SBB is stored within queue 30 either before or no later than the same clock cycle in which queue 30 is filled. Again, if both the target and branch execution unit instructions are eventually stored in queue 30 at the same time, then it is confirmed that the indication in BTB 28 is accurate; otherwise, the indication is inaccurate and corrected as mentioned above. Thereafter, the method continues as demonstrated above, that is, to proceed in an inventive manner if the loop is a short backward branch or, if the loop represents a longer backward branch, to proceed as in the prior art.

From the above, one skilled in art may appreciate numerous benefits of the present embodiments. For example, a microprocessor in accordance with the various embodiments may execute more than one iteration of a short backward branch loop in a single execution cycle, or instructions corresponding to portions of different iterations of a short backward branch loop in a single cycle. As a result, more execution units are used during each execution cycle when executing a short backward branch as compared to the prior art. As another benefit, the functionality set forth above may be implemented using various configurations by a person skilled in the art. As another benefit, the present embodiments may be modified by a person skilled in the art while still accomplishing the above-described functionality. For example, above is presented a microprocessor with eight execution units; however, as mentioned above this number may be decreased or increased. As another example, the definition established above for the length of a short backward branch loop demonstrates that the number of execution unit instructions in such a loop may vary as well. Indeed, for a microprocessor with a large number of execution units, and/or for a short backward branch loop having a small number of execution unit instructions, two or more iterations of that loop may be executed in a single clock cycle. Still further advantages of the present system have been stated above, which also demonstrate various alternative embodiments included within the inventive scope. Still other examples will be ascertainable by a person skilled in the art. Therefore, these benefits and examples serve further to demonstrate that while the present embodiments have been described in detail, various substitutions, modifications or alterations could be made to the descriptions set forth above, and all of the above demonstrates the flexibility of the inventive scope which is defined by the following claims.

We claim:

1. A method of operating a microprocessor, comprising:

fetching a short backward branch loop of instructions, wherein said short backward branch loop of instructions comprises a branch instruction and a target instruction and wherein said short backward branch loop of instructions has a corresponding short backward branch loop of execution unit instructions;

determining that said branch instruction is a short backward branch instruction after said step of fetching said short backward branch loop of instructions;

without re-fetching said short backward branch loop of instructions after said fetching step, executing a plurality of iterations of said short backward branch loop of execution unit instructions over a plurality of clock cycles; and wherein said executing step comprises, in certain ones of said plurality of clock cycles:

executing a first set of said execution unit instructions corresponding to a first iteration of said plurality of iterations; and executing a second set of said execution unit instructions corresponding to a second iteration of said plurality of iterations, wherein said second iteration immediately follows said first iteration.

2. The method of claim 1:

and further comprising storing said short backward branch loop of execution unit instructions;

wherein said storing step comprises storing said short backward branch loop of execution unit instructions into a queue having an integer number Q of storage cells prior to said executing step;

wherein said short backward branch loop of execution unit instructions has an integer L number of execution unit instructions; and wherein said integer L is less than said integer Q.

3. The method of claim 1 wherein said step of fetching said short backward branch loop of instructions comprises fetching complex instruction set architecture instructions.

4. The method of claim 3 wherein said execution unit instructions differ from said instruction set architecture instructions.

5. The method of claim 1 wherein said step of fetching said short backward branch loop of instructions comprises fetching reduced instruction set architecture instructions.

6. The method of claim 5 wherein said execution unit instructions are the same as said instruction set architecture instructions.

7. The method of claim 1 and further comprising the step of decoding said short backward branch loop of instructions to form said short backward branch loop of execution unit instructions.

8. The method of claim 1:
wherein said step of fetching a short backward branch loop of instructions further comprises fetching said short backward branch loop of instructions in a first clock cycle;
further comprising the step of fetching, in said first clock cycle, additional instructions sequentially oriented after said branch instruction; and
further comprising the step of fetching, in a second clock cycle immediately after said first clock cycle, a second group of instructions sequentially oriented immediately after said additional instructions.

9. The method of claim 8:
wherein said step of executing said plurality of iterations comprises executing a final iteration of said short backward branch loop in a third clock cycle; and
further comprising, in a clock cycle after said third clock cycle, the step of executing at least one execution unit instruction corresponding to at least one instruction of said second group of instructions without having to re-fetch said at least one instruction.

10. The method of claim 1:
wherein said short backward branch loop has an integer L number of said execution unit instructions;
wherein said microprocessor comprises an integer number E of execution units for performing said executing step; and
wherein said integer number L is less than said integer number E.

11. The method of claim 1:
wherein said short backward branch loop has an integer L number of said execution unit instructions;
wherein said microprocessor comprises an integer number E of execution units for performing said executing step; and
wherein said integer number L is more than said integer number E.

12. The method of claim 1:
and further comprising storing said short backward branch loop of execution unit instructions;
wherein said storing step comprises storing said short backward branch loop of execution unit instructions into a queue having an integer number Q of storage cells prior to said executing step;
and prior to said executing step, further comprising the step of communicating said short backward branch loop of execution unit instructions from said queue to a schedule circuit in a circular fashion.

13. The method of claim 12 and further comprising the step of scheduling said short backward branch loop of execution unit instructions for execution prior to said executing step.

14. A method of operating a microprocessor, comprising:
fetching a short backward branch loop of instructions, wherein said short backward branch loop comprises a branch instruction and a target instruction and wherein said short backward branch loop of instructions has a corresponding short backward branch loop of execution unit instructions;
determining that said branch instruction is a short backward branch instruction after said step of fetching said short backward branch loop of instructions;
storing said short backward branch loop of execution unit instructions, wherein said short backward branch loop has an integer L number of execution unit instructions comprising a branch execution unit instruction and a target execution unit instruction, and wherein said storing step comprises storing said short backward branch loop of execution unit instructions into a queue having an integer number Q of storage cells;
communicating said short backward branch loop of execution unit instructions from said queue to a schedule circuit in a circular fashion;
without re-fetching said short backward branch loop of instructions after said storing step and said communicating step, executing a plurality of iterations of said short backward branch loop of execution unit instructions over a plurality of clock cycles; and
wherein said executing step comprises, in certain ones of said plurality of clock cycles:
executing a first set of said execution unit instructions corresponding to a first iteration of said plurality of iterations; and
executing a second set of said execution unit instructions corresponding to a second iteration of said plurality of iterations, wherein said second iteration immediately follows said first iteration.

15. The method of claim 14 wherein said step of fetching said short backward branch loop of instructions comprises fetching complex instruction set architecture instructions.

16. The method of claim 15 wherein said execution unit instructions differ from said instruction set architecture instructions.

17. The method of claim 14 wherein said step of fetching said short backward branch loop of instructions comprises fetching reduced instruction set architecture instructions.

18. The method of claim 17 wherein said execution unit instructions are the same as said instruction set architecture instructions.

19. The method of claim 14:
wherein said step of fetching a short backward branch loop of instructions further comprises fetching said short backward branch loop of instructions in a first clock cycle;
further comprising the step of fetching, in said first clock cycle, additional instructions sequentially oriented after said branch instruction; and
further comprising the step of fetching, in a second clock cycle immediately after said first clock cycle, a second group of instructions sequentially oriented immediately after said additional instructions.

20. The method of claim 19:
wherein said step of executing said plurality of iterations comprises executing a final iteration of said short backward branch loop in a third clock cycle; and
further comprising, in a clock cycle after said third clock cycle, the step of executing at least one execution unit instruction corresponding to at least one instruction of said second group of instructions without having to re-fetch said at least one instruction.

21. A method of operating a microprocessor, comprising:
fetching a short backward branch loop of instructions over an integer number C of one or more clock cycles, wherein said short backward branch loop comprises a branch instruction and a target instruction, and wherein said short backward branch loop of instructions has a corresponding short backward branch loop of execution unit instructions;

determining that said branch instruction is a short backward branch instruction after said step of fetching said short backward branch loop of instructions;

executing a plurality of iterations of said short backward branch loop of execution unit instructions over a plurality of clock cycles, wherein said microprocessor comprises an integer number E of execution units for performing said executing step and such that an execution unit time slot is defined for each of said execution units during each of said plurality of clock cycles; and wherein an average number of said execution unit time slots for executing each of said plurality of iterations is less than a product of said integer C times said integer E.

22. The method of claim 21:
and further comprising storing said short backward branch loop of execution unit instructions;
wherein said storing step comprises storing said short backward branch loop into a queue having an integer number Q of storage cells prior to said executing step;
wherein said short backward branch loop has an integer L number of execution unit instructions; and
wherein said integer L is less than said integer Q.

23. The method of claim 21 wherein said step of fetching said short backward branch loop of instructions comprises fetching complex instruction set architecture instructions.

24. The method of claim 23 wherein said execution unit instructions differ from said instruction set architecture instructions.

25. The method of claim 21 wherein said step of fetching said short backward branch loop of instructions comprises fetching reduced instruction set architecture instructions.

26. The method of claim 25 wherein said execution unit instructions are the same as said instruction set architecture instructions.

27. The method of claim 21 and further comprising the step of decoding said short backward branch loop of instructions to form said short backward branch loop of execution unit instructions.

28. The method of claim 21:
wherein said step of fetching a short backward branch loop of instructions further comprises fetching said short backward branch loop of instructions in a first clock cycle;
further comprising the step of fetching, in said first clock cycle, additional instructions sequentially oriented after said branch instruction; and
further comprising the step of fetching, in a second clock cycle immediately after said first clock cycle, a second group of instructions sequentially oriented immediately after said additional instructions.

29. The method of claim 28:
wherein said step of executing said plurality of iterations comprises executing a final iteration of said short backward branch loop in a third clock cycle; and
further comprising, in a clock cycle after said third clock cycle, the step of executing at least one execution unit instruction corresponding to at least one instruction of said second group of instructions without having to re-fetch said at least one instruction.

30. The method of claim 21:
wherein said short backward branch loop has an integer L number of execution unit instructions; and
wherein said integer number L is less than said integer number E.

31. The method of claim 21:
wherein said short backward branch loop has an integer L number of execution unit instructions; and
wherein said integer number L is more than said integer number E.

32. The method of claim 21:
and further comprising storing said short backward branch loop of execution unit instructions;
wherein said storing step comprises storing said short backward branch loop into a queue having an integer number Q of storage cells prior to said executing step;
and prior to said executing step, further comprising the step of communicating said short backward branch loop of execution unit instructions from said queue to a schedule circuit in a circular fashion.

33. The method of claim 21 and further comprising the step of scheduling said short backward branch loop of execution unit instructions for execution prior to said executing step.

34. A microprocessor, comprising:
circuitry for fetching a short backward branch loop of instructions, wherein said short backward branch loop comprises a branch instruction and a target instruction and wherein said short backward branch loop of instructions has a corresponding short backward branch loop of execution unit instructions;
circuitry for determining that said branch instruction is a short backward branch instruction after fetching said short backward branch loop of instructions;
circuitry for executing a plurality of iterations of said short backward branch loop of execution unit instructions over a plurality of clock cycles without re-fetching said short backward branch loop after storing said short backward branch loop of execution unit instructions; and
wherein said circuitry for executing comprises, in certain ones of said plurality of clock cycles:
circuitry for executing a first set of said execution unit instructions corresponding to a first iteration of said plurality of iterations; and
circuitry for executing a second set of said execution unit instructions corresponding to a second iteration of said plurality of iterations, wherein said second iteration immediately follows said first iteration.

35. The microprocessor of claim 34:
and further comprising circuitry for storing said short backward branch loop of execution unit instructions;
wherein said circuitry for storing comprises a queue having an integer number Q of storage cells;
wherein said short backward branch loop has an integer L number of execution unit instructions; and
wherein said integer L is less than said integer Q.

36. The microprocessor of claim 34 wherein said circuitry for fetching said short backward branch loop of instructions comprises circuitry for fetching complex instruction set architecture instructions.

37. The microprocessor of claim 36 wherein said execution unit instructions differ from said instruction set architecture instructions.

38. The microprocessor of claim 34 wherein said circuitry for fetching said short backward branch loop of instructions comprises circuitry for fetching reduced instruction set architecture instructions.

39. The microprocessor of claim 38 wherein said execution unit instructions are the same as said instruction set architecture instructions.

40. The microprocessor of claim 34 and further comprising circuitry for decoding said short backward branch loop of instructions to form said short backward branch loop of execution unit instructions.

41. The microprocessor of claim 34:

wherein said circuitry for fetching a short backward branch loop of instructions fetches said short backward branch loop of instructions in a first clock cycle and further fetches, in said first clock cycle, additional instructions sequentially oriented after said branch instruction; and wherein said circuitry for fetching further fetches, in a second clock cycle immediately after said first clock cycle, a second group of instructions sequentially oriented immediately after said additional instructions.

42. The microprocessor of claim 41:

wherein said circuitry for executing said plurality of iterations executes a final iteration of said short backward branch loop in a third clock cycle; and in a clock cycle after said third clock cycle, said circuitry for executing further executes at least one execution unit instruction corresponding to at least one instruction of said second group of instructions without said circuitry for fetching having to re-fetch said at least one instruction.

43. The microprocessor of claim 34:

and further comprising circuitry for storing said short backward branch loop of execution unit instructions;

wherein said circuitry for storing comprises a queue having an integer number Q of storage cells;

and further comprising circuitry for communicating said short backward branch loop of execution unit instructions from said queue to a schedule circuit in a circular fashion prior to execution of said plurality of iterations of said short backward branch loop of execution unit instructions by said circuitry for executing.

44. A microprocessor, comprising:

circuitry for fetching a short backward branch loop of instructions over an integer number C of one or more clock cycles, wherein said short backward branch loop comprises a branch instruction and a target instruction and wherein said short backward branch loop of instructions has a corresponding short backward branch loop of execution unit instructions;

circuitry for determining that said branch instruction is a short backward branch instruction after said short backward branch loop of instructions is fetched by said circuitry for fetching;

circuitry for storing said short backward branch loop of execution unit instructions;

circuitry for executing a plurality of iterations of said short backward branch loop of execution unit instructions over a plurality of clock cycles without re-fetching said short backward branch look after storing said short backward branch loop of execution unit instructions, wherein said circuitry for executing comprises an integer number E of execution units for executing such that an execution unit time slot is defined for each of said execution units during each of said plurality of clock cycles; and wherein an average number of said execution unit time slots for executing each of said plurality of iterations is less than a product of said integer C times said integer E.

\* \* \* \* \*

UNITED STATES PATENT AND TRADEMARK OFFICE
CERTIFICATE OF CORRECTION

PATENT NO. : 5,951,679
DATED : 9/14/99
INVENTOR(S) : Timothy D. Anderson, Jonathan H. Shiell It is certified that error appears in the above-identified patent and that said Letters Patent is hereby corrected as shown below:

Cover Page, insert Item [60] under Related U.S. Application Data

--Provisional Application No. 60/029,230 October 31, 1996.--

Signed and Sealed this

Twenty-ninth Day of May, 2001

*Attest:*

NICHOLAS P. GODICI

*Attesting Officer*     *Acting Director of the United States Patent and Trademark Office*